United States Patent
Kazmi et al.

(10) Patent No.: US 10,912,023 B2
(45) Date of Patent: *Feb. 2, 2021

(54) SYSTEM AND METHOD FOR ACTIVATING AND DEACTIVATING MULTIPLE SECONDARY CELLS

(71) Applicant: Telefonaktiebolaget LM Ericsson (publ), Stockholm (SE)

(72) Inventors: Muhammad Kazmi, Bromma (SE); Christopher Callender, Kinross (GB); Iana Siomina, Täby (SE)

(73) Assignee: Telefonaktiebolaget LM Ericsson (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/411,413

(22) Filed: May 14, 2019

(65) Prior Publication Data

US 2019/0274100 A1 Sep. 5, 2019

Related U.S. Application Data

(63) Continuation of application No. 15/834,219, filed on Dec. 7, 2017, now Pat. No. 10,299,204, which is a
(Continued)

(51) Int. Cl.
*H04W 52/02* (2009.01)
*H04J 11/00* (2006.01)
(Continued)

(52) U.S. Cl.
CPC ......... *H04W 52/0206* (2013.01); *H04J 11/00* (2013.01); *H04L 61/6022* (2013.01);
(Continued)

(58) Field of Classification Search
CPC ............ H04W 52/0206; H04L 61/6022
See application file for complete search history.

(56) References Cited

U.S. PATENT DOCUMENTS 8,224,946 B2 7/2012 Allan et al.
8,780,860 B2 * 7/2014 Kwon ............... H04L 5/0005
370/328
(Continued)

FOREIGN PATENT DOCUMENTS

CN 102413554 A 4/2012
CN 103621001 A 3/2014
(Continued)

OTHER PUBLICATIONS

3GPP TSG-RAN WG4 Meeting #70; Prague, Czech Republic; Source: Ericsson. Title: Impace on RRM Requirements in 3 DL CA (R4-140743) Feb. 10-14, 2014.
(Continued)

*Primary Examiner* — Parth Patel
(74) *Attorney, Agent, or Firm* — Baker Botts, LLP

(57) ABSTRACT

According to certain embodiments, a method for activating and deactivating multiple secondary cells (150A-B) includes receiving a first message requesting activation or deactivation of a first secondary cell (first SCell) (150A) for a first carrier. In response to the first message, a first procedure is initiated to activate or deactivate the first SCell (150A). The wireless device (110A) may have a first delay period ($T_{activate\_basic}$) within which to complete the first procedure. While performing the first procedure to activate or deactivate the first SCell (150A), a second message to activate, deactivate, configure or deconfigure a second SCell (150B) for a second carrier is received. In response to receiving the second message to activate, deactivate, configure, or deconfigure the second SCell (150B), the first procedure may be modified by replacing the first delay period with a second delay period ($T_{activate\_total}$) within which to complete the first procedure to activate or deactivate the first SCell
(Continued)

(150A). The second delay period ($T_{activate\_total}$) may be greater than the first delay period ($T_{activate\_basic}$).

28 Claims, 8 Drawing Sheets

Related U.S. Application Data continuation of application No. 14/758,988, filed as application No. PCT/SE2015/050195 on Feb. 19, 2015, now Pat. No. 9,872,245.

(60) Provisional application No. 61/969,704, filed on Mar. 24, 2014.

(51) Int. Cl.
  *H04L 29/12* (2006.01)
  *H04W 72/12* (2009.01)
  *H04W 88/02* (2009.01)
  *H04W 88/12* (2009.01)

(52) U.S. Cl.
  CPC ........ *H04W 72/1226* (2013.01); *H04W 88/02* (2013.01); *H04W 88/12* (2013.01); *Y02B 70/30* (2013.01); *Y02D 30/70* (2020.08)

(56) References Cited

U.S. PATENT DOCUMENTS

| | | | | |
|---|---|---|---|---|
| 9,055,565 | B2* | 6/2015 | Kim | H04L 5/001 |
| 9,496,997 | B2* | 11/2016 | Park | H04B 7/024 |
| 2011/0243016 | A1* | 10/2011 | Zhang | H04W 52/365 |
| | | | | 370/252 |
| 2012/0176926 | A1* | 7/2012 | Jang | H04W 24/02 |
| | | | | 370/252 |
| 2012/0252432 | A1* | 10/2012 | Henttonen | H04W 24/10 |
| | | | | 455/422.1 |
| 2012/0257569 | A1* | 10/2012 | Jang | H04W 76/19 |
| | | | | 370/328 |
| 2013/0060817 | A1 | 3/2013 | Koponen et al. | |
| 2013/0136094 | A1* | 5/2013 | Wei | H04W 52/0203 |
| | | | | 370/329 |
| 2013/0188612 | A1* | 7/2013 | Dinan | H04W 56/0005 |
| | | | | 370/336 |
| 2013/0194947 | A1* | 8/2013 | Ehsan | H04L 5/0098 |
| | | | | 370/252 |
| 2013/0242891 | A1* | 9/2013 | Ye | H04W 74/0833 |
| | | | | 370/329 |
| 2014/0078942 | A1* | 3/2014 | Noh | H04W 72/0413 |
| | | | | 370/280 |
| 2014/0086127 | A1* | 3/2014 | Kim | H04L 5/001 |
| | | | | 370/311 |
| 2014/0098690 | A1* | 4/2014 | Siomina | G01S 5/12 |
| | | | | 370/252 |
| 2014/0119305 | A1* | 5/2014 | Li | H04W 52/146 |
| | | | | 370/329 |
| 2014/0146697 | A1* | 5/2014 | Kim | H04B 7/0413 |
| | | | | 370/252 |
| 2014/0177500 | A1* | 6/2014 | Han | H04W 52/36 |
| | | | | 370/311 |
| 2014/0233409 | A1* | 8/2014 | Lee | H04W 24/08 |
| | | | | 370/252 |
| 2014/0233524 | A1* | 8/2014 | Jang | H04W 74/0833 |
| | | | | 370/329 |
| 2014/0293896 | A1* | 10/2014 | Kuo | H04W 72/0413 |
| | | | | 370/329 |
| 2015/0043489 | A1* | 2/2015 | Tseng | H04L 5/0098 |
| | | | | 370/329 |
| 2015/0050939 | A1* | 2/2015 | Futaki | H04W 24/08 |
| | | | | 455/452.1 |
| 2015/0055454 | A1* | 2/2015 | Yang | H04W 36/22 |
| | | | | 370/230 |
| 2015/0078261 | A1* | 3/2015 | Yu | H04W 72/0453 |
| | | | | 370/329 |
| 2015/0092707 | A1* | 4/2015 | Kwon | H04L 5/001 |
| | | | | 370/329 |
| 2015/0110010 | A1* | 4/2015 | Wei | H04W 74/006 |
| | | | | 370/329 |
| 2015/0139518 | A1 | 7/2015 | Soo | |
| 2015/0189516 | A1* | 7/2015 | Seo | H04L 5/001 |
| | | | | 370/329 |
| 2015/0223235 | A1* | 8/2015 | Hwang | H04B 7/02 |
| | | | | 370/329 |
| 2015/0223243 | A1* | 8/2015 | Tabet | H04W 28/085 |
| | | | | 370/330 |
| 2015/0230253 | A1* | 8/2015 | Jang | H04L 5/001 |
| | | | | 370/280 |
| 2015/0257163 | A1* | 9/2015 | Dalsgaard | H04W 72/042 |
| | | | | 455/452.2 |
| 2015/0304092 | A1* | 10/2015 | Hwang | H04L 5/0098 |
| | | | | 370/280 |
| 2015/0319690 | A1* | 11/2015 | Wei | H04L 5/0007 |
| | | | | 370/311 |
| 2015/0365218 | A1* | 12/2015 | Yang | H04L 5/0044 |
| | | | | 370/329 |
| 2016/0029233 | A1* | 1/2016 | Kollar | H04W 24/08 |
| | | | | 370/252 |
| 2016/0050605 | A1* | 2/2016 | Kim | H04W 28/08 |
| | | | | 370/331 |
| 2016/0128003 | A1* | 5/2016 | Callender | H04W 52/365 |
| | | | | 370/311 |
| 2016/0165627 | A1* | 6/2016 | Uemura | H04W 72/0446 |
| 2016/0198439 | A1* | 7/2016 | Dalsgaard | H04L 5/0098 |
| | | | | 370/329 |
| 2016/0255577 | A1* | 9/2016 | Kazmi | H04W 52/0206 |
| | | | | 370/311 |
| 2016/0302198 | A1* | 10/2016 | Lee | H04L 1/1861 |
| 2016/0316466 | A1* | 10/2016 | Liu | H04W 72/042 |
| 2018/0043489 | A1 | 2/2018 | Suzuki | |

FOREIGN PATENT DOCUMENTS

| | | |
|---|---|---|
| JP | 2013511916 A | 4/2013 |
| WO | 2013 055108 A2 | 4/2013 |
| WO | 2013029552 A1 | 7/2013 |

OTHER PUBLICATIONS

3GPP TS 36.133 V12.3.0; Technical Specification; 3rd Generation Partnership Project; Technical Specification Group Radio Access network; Evolved Universal Terrestrial Radio Access (E-UTRA); Requirements for Support of Radio Resource management; Draft (Release 12) Mar. 2014.
PCT International Search Report for International Application No. PCT/SE2015/050195 (dated May 8, 2015).
3GPP TSG-RAN WG2 Meeting #85bis; Valencia, Spain; Partial Resubmission of R2-140134; Source: NSN: Nokia Corporation; Title: SCG Cell Scheduling and Activiation (R2-141181)—Mar. 31-Apr. 4, 2014.
3GPP TS 36.133 v10 14.0 Technical Specification; 3rd Generation Partnership Project; Technical Specification Group Radio Access Network; Evolved Universal Terrestrial Radio Access (E-UTRA); Requirements for Support of Radio Resource Management (Release 10)—Mar. 2014
Notice of Reasons for Rejection issued by the Japanese Patent of for Patent Application No. 2016-558602; Date Prepared; Apr. 4, 2017; dated Apr. 18, 2017.
3GPP TSG-RAN WG4 Meeting #70; Prague, Czech Republilc: Source: Ericsson; Title: Impact on RRM Requirements in 3 DL CA (R4-140743)—Feb. 10-14, 2014
Korean Patent Office; Office Action; Korean Patent Application No. 10-2016-7029619 (with English translation); dated Mar. 20, 2017
First Office Action issued by the Spanish Patent Office for Application No. 2381-2016, based on PCT/SE2015/050195 in the name of Telefonalctiebolaget LM Ericsson (English translation attached)—dated Apr. 16, 2018

(56) References Cited

OTHER PUBLICATIONS

Examination Report issued by the Government of India for Application No. 201637035616—dated Nov. 25, 2019.
Brazil Office Action issued by the Federal Public Service Ministry of Economy National Institute of Industrial Property for Order No. BR112016021828-0—dated Sep. 9, 2020.

* cited by examiner

SYSTEM AND METHOD FOR ACTIVATING AND DEACTIVATING MULTIPLE SECONDARY CELLS

PRIORITY

This application is a continuation, under 35 U.S.C. § 120, of U.S. patent application Ser. No. 15/834,219 which is a continuation, under 35 U.S.C. § 120, of U.S. patent application Ser. No. 14/758,988 filed on Jul. 2, 2015, which is a non-provisional application is a U.S. National Stage Filing under 35 U.S.C. § 371 of international Patent Application Serial No, PCT/SE2015/050195, flied Feb. 19, 2015, and entitled "System and Method fir Activating and Deactivating Multiple Secondary Cells" which claims priority to U.S. Provisional Patent Application No. 61/969,704 filed Mar. 24, 2014, both of which are hereby incorporated by reference in their entirety.

TECHNICAL FIELD

Particular embodiments relate generally to wireless communications and more particularly to a system and method for activating and deactivating multiple secondary cells.

BACKGROUND

Generally the primary carrier carries the essential signaling that is specific to the wireless communication device. The primary carrier exists in both the uplink and downlink directions. Thus, if there is only a single uplink component carrier, the primary cell (PCell) is on that component carrier. The network may assign different primary carriers to different wireless communication devices operating in the same sector or cell.

A network node uses a multi-carrier secondary cell (SCell) setup procedure to at least temporarily setup or release an SCell for a wireless communication device capable of multi-carrier operation. The SCell may be setup or released in the downlink, uplink, or both. Examples of commands that the network can use in the multi-carrier SCell setup procedure include Configuration of SCell(s), De-configuration of SCell(s), Activation of SCell(s), and Deactivation of SCell(s).

The configuration procedure is used by the serving radio network node (e.g., eNode B in LTE) to configure a carrier aggregation capable wireless communication device with one or more SCells in the downlink, uplink, or both. The de-configuration procedure is used by the serving radio network node to de-configure or remove one or more already configured SCells in the downlink, uplink, or both. The configuration or de-configuration procedure can also be used to change the current multi-carrier configuration. For example, the number of SCells can be increased or decreased, or existing SCells can be swapped with new ones.

In contrast to a PCell, which is always activated, SCells may be activated and deactivated as needed. Specifically, the serving radio network node may initiate activation of one or more deactivated SCells or deactivation of one or more active SCells on the corresponding configured secondary carriers. The configured SCells are initially deactivated upon addition and after a cell change, such as a handover. In LTE, the activation and deactivation command is sent by the eNode B to the wireless device via a media access control-control element, MAC-CE. The deactivation of SCell saves the wireless communication device's battery power.

In response to receiving the command to activate or deactivate the SCell, the wireless device, which may also be termed user equipment (UE), must activate or deactivate the SCell within a specified minimum time requirement. For example, TS 36.133 release 10 defines certain SCell activation delay requirements. Specifically, upon receiving SCell activation command in subframe n, the wireless device shall be capable to transmit a valid channel state information, CSI, report and apply actions related to the activation command for the SCell being activated no later than in subframe n+24 provided the following conditions are met for the SCell: 1) during the period equal to max(5 measCycleSCell, 5 Discontinuous reception (DRX) cycles) before the reception of the SCell activation command, (a) the wireless communication device has sent a valid measurement report for the SCell being activated, and (b) the SCell being activated remains detectable according to the cell identification conditions, and 2) the SCell being activated also remains detectable during the SCell activation delay according to the cell identification conditions. Otherwise upon receiving the SCell activation command in subframe n, the wireless device shall be capable to transmit a valid CSI report and apply actions related to the activation command for the SCell being activated no later than in subframe n+34 provided the SCell can be successfully detected on the first attempt.

The SCell deactivation delay requirements are also defined in TS 36.133 release 10. According to which, upon receiving SCell deactivation command or upon expiry of the sCellDeactivationTimer in subframe n, the wireless device shall accomplish the deactivation actions for the SCell being deactivated no later than in subframe n+8.

However, the activation or deactivation of one SCell may be interfered with by operations related to another SCell. For example, the activation or deactivation of a first SCell may be severely degraded when the wireless device receives a command to configure or deconfigure a second SCell while the wireless device is performing the activation or deactivation procedure for the first SCell.

SUMMARY

Some embodiments propose solutions to activating and deactivating multiple secondary cells. A method for activating and deactivating multiple secondary cells by a wireless device using carrier aggregation to receive signals from a plurality of carriers in a primary cell (PCell) and a plurality of secondary cells (SCells). For example, according to a particular embodiment, a method includes receiving a first message requesting activation or deactivation of a first secondary cell (first SCell) for a first carrier. In response to the first message, a first procedure is initiated to activate or deactivate the first SCell. The wireless device has a first delay period ($T_{activate\ basic}$) within which to complete the first procedure. While performing the first procedure to activate or deactivate the first SCell, a second message to activate, deactivate, configure or deconfigure a second SCell for a second carrier is received. In response to receiving the second message to activate, deactivate, configure, or deconfigure the second SCell, the first procedure is modified by replacing the first delay period with a second delay period ($T_{activate\ total}$) within which to complete the first procedure to activate or deactivate the first SCell. The second delay period ($T_{activate\ total}$) is greater than the first delay period ($T_{activate\ basic}$).

As another example, according to a particular embodiment, a wireless device using carrier aggregation to receive signals from a plurality of carriers in a primary cell (Pcell) and a plurality of secondary cells (SCells) includes memory containing executable instructions; and one or more processors in communication with the memory. The one or more processors are operable to execute the instructions to cause the wireless device to receive a first message requesting activation or deactivation of a first secondary cell (first SCell) for a first carrier. In response to the first message, a first procedure is initiated to activate or deactivate the first SCell. The wireless device has a first delay period ($T_{activate\_basic}$) within which to complete the first procedure. While performing the first procedure to activate or deactivate the first SCell, a second command to activate, deactivate, configure, or deconfigure a second SCell for a second carrier is received. In response to receiving the second message to activate, deactivate, configure, or deconfigure the second SCell, the first procedure is modified by replacing the first delay period with a second delay period ($T_{activate\_total}$) within which to complete the first procedure to activate or deactivate the first SCell. The second delay period ($T_{activate\_total}$) is greater than the first delay period ($T_{activate\_basic}$).

As another example, according to a particular embodiment, a method in a first network node serving a wireless device that is using carrier aggregation to receive signals from a plurality of carriers in a primary cell (Pcell) and a plurality of secondary cells (SCells). The method includes determining, by the first network node, that the wireless device has received a first message requesting the wireless device to activate or deactivate a first SCell for a first carrier. The first network node determines a delay period ($T_{activate\_basic}$) within which the wireless device is to activate or deactivate the first SCell. The first network node delays sending a second message requesting the activation, deactivation, configuration, or deconfiguration of a second SCell. The second message is delayed an amount of time that is a function of the delay period.

As still another example, according to a particular embodiment, a first network node serving a wireless device that uses carrier aggregation to receive signals from a plurality of carriers in a primary cell (Pcell) and a plurality of secondary cells (SCells) includes memory containing executable instruction and one or more processors in communication with the memory. The one or more processors are operable to execute the instructions to cause the first network node to determine that the wireless device has received a first message requesting the wireless device to activate or deactivate a first SCell for a first carrier. A delay period ($T_{activate\_basic}$) within which the wireless device is to activate or deactivate the first SCell is determined. The sending of a second message requesting the activation, deactivation, configuration, or deconfiguration of a second SCell is delayed. The second message is delayed an amount of time that is a function of the delay period.

As another example, according to a particular embodiment, an apparatus includes a first receiving module configured to receive a first message requesting activation or deactivation of a first secondary cell (first SCell) for a first carrier. An initiating module is configured to initiate a first procedure to activate or deactivate the first SCell in response to the first message. The apparatus may have a first delay period ($T_{activate\_basic}$) within which to complete the first procedure. A second receiving module is configured to receive a second message to activate, deactivate, configure, or deconfigure a second SCell for a second carrier while performing the first procedure to activate or deactivate the first SCell. A modifying module is configured to modify the first procedure in response to receiving the second message to activate, deactivate, configure, or deconfigure the second SCell. Modifying the first procedure may include replacing the first delay period with a second delay period ($T_{activate\_total}$) within which to complete the first procedure to activate or deactivate the first SCell. The second delay period ($T_{activate\_total}$) is greater than the first delay period ($T_{activate\_basic}$).

As another example, according to a particular embodiment, an apparatus includes a first determining module configured to determine that a wireless device has received a first message requesting the wireless device to activate or deactivate a first SCell for a first carrier. A second determining module is configured to determine a delay period ($T_{activate\_basic}$) within which the wireless device is to activate or deactivate the first SCell. A delaying module is configured to delay sending a second message requesting the activation, deactivation, configuration, or deconfiguration of a second SCell. The second message is delayed an amount of time that is a function of the delay period.

Some embodiments of the disclosure may provide one or more technical advantages. For example, in certain embodiments, techniques employed may enable the wireless device to more efficiently and accurately activate or deactivate a SCell even while being requested to activate, deactivate, configure or deconfigure one or more additional SCells. Another technical advantage may be that the network node is made aware of user equipment performance. For example, the network node may be made aware of the time required to perform SCell setup or release when the user equipment performs setting up or release of more than one SCell during at least partly overlapping time. Still another technical advantage may be that the techniques ensure that the user equipment behavior is well defined and consistent even if the user equipment is requested to setup or release several SCells during at least partly overlapping time. Still another technical advantage may be that the network node may not have to wait for the completion of SCell setup or release for one SCell before requesting the set up or release of another SCell. That is, the network node may send concurrent requests to the user equipment for the performance of SCell setup or release for more than one SCells.

Some embodiments may benefit from some, none, or all of these advantages. Other technical advantages may be readily ascertained by one of ordinary skill in the art.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
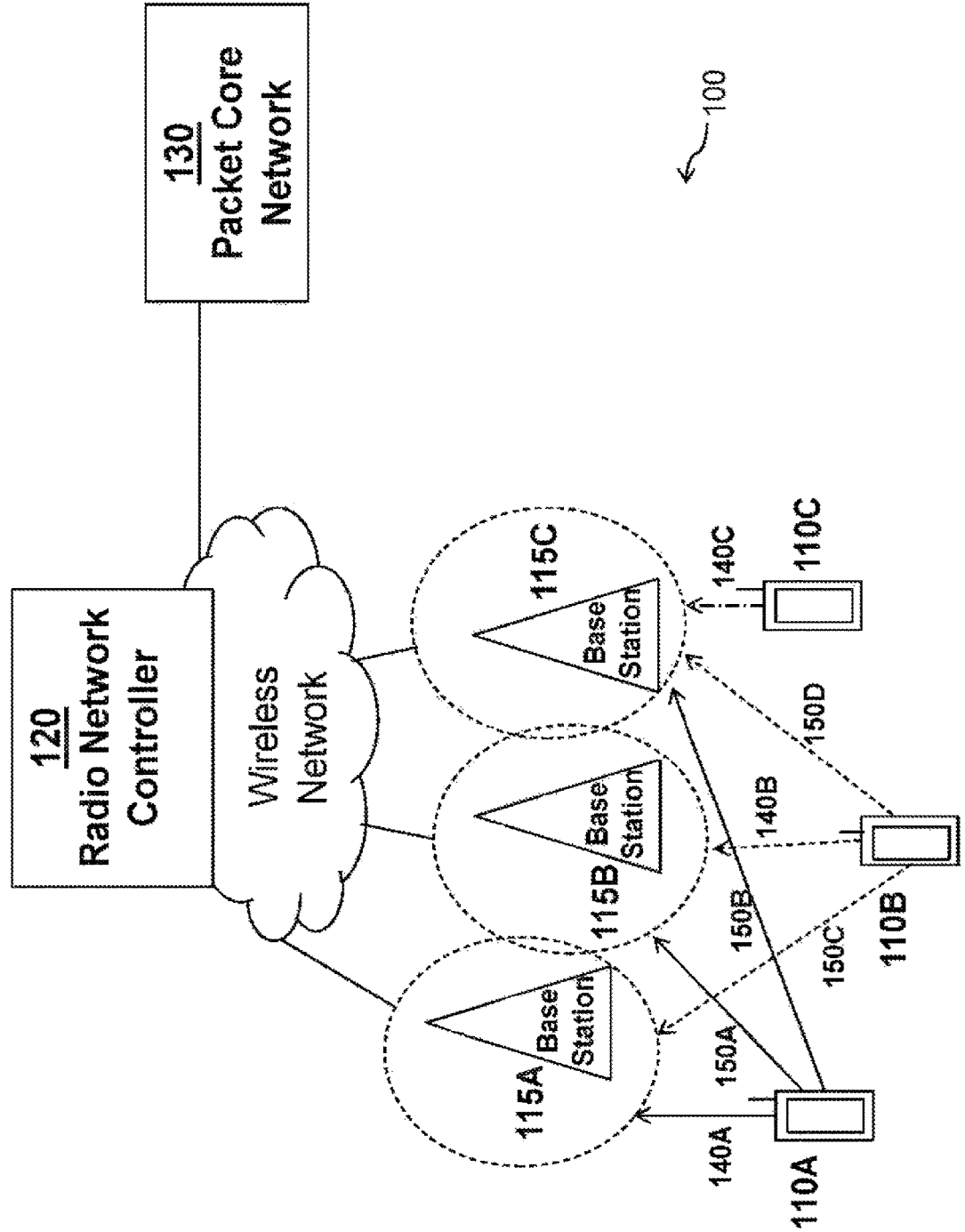
FIG. 1 is a block diagram illustrating an exemplary wireless network, according to particular embodiments.

A problem with existing solutions for carrier aggregation is that a wireless network node using carrier aggregation to receive service form a plurality of secondary carriers may receive multiple overlapping commands to activate or deactivate secondary carriers. For example, according to certain embodiments, a wireless device that is currently performing an operation to activate a first secondary cell (SCell) may receive a command to deactivate, activate, configure, or deconfigure a second SCell. The second received command may interfere with the performance of the activation or deactivation of the second SCell. As a result, the wireless device may not activate or deactivate the first SCell within the specified minimum requirement for activation or deactivation.

Certain embodiments of the present disclosure may provide a solution to this or other problems. In some embodiments, a wireless device capable of at least two SCells may adapt the procedure used to activate or deactivate a first SCell based on whether a command is received relating to the activation, deactivation, or other reconfiguration of a second SCell. For example, while setting up or releasing a first SCell, wireless device may also receive a request to set up or release a second SCell. In this case, wireless device may adapt its procedure to meet one or more second pre-defined requirements related to the SCell setup or release. In certain embodiments, the second pre-defined requirements may be less stringent than the first pre-defined requirements, wherein the latter are required to be met by the wireless device while setting up or releasing the first SCell when a request is not received for the set up or release of the second SCell. In particular embodiments, examples of pre-defined requirements may be SCell activation delay, SCell deactivation delay, or other timing requirements.

In certain embodiments that will be described in more detail below, a network node may deliberately delay sending the SCell setup or release request message to the wireless device for setting or releasing a first SCell, provided it is determined by the network node that the wireless device capable of at least two SCells is already performing or expected to perform the setting up or release of the other SCell. The delayed message may be sent after the wireless device has set up or released a second SCell. In case of activation, the network may determine that the other SCell has activated, as this is indicated by the wireless device sending a valid CQI for the other SCell. In case of deactivation, configuration, and deconfiguration, the minimum requirements (e.g., maximum delay) for the time taken by the procedures may be pre-defined or otherwise known or determined based on one or more technical specifications. By using this method, a network node may avoid the situation where set up or release of more than two SCells partly or fully overlaps in time, in particular embodiments.

Particular embodiments are described in FIGS. 1-8 of the drawings, like numerals being used for like and corresponding parts of the various drawings.

FIG. 1 is a block diagram illustrating embodiments of a wireless network 100 that includes one or more wireless devices 110A-C, radio network nodes 115A-C, radio network controller 120, and core network nodes 130. A wireless device 110 may communicate with a radio network node 115A-C over a wireless interface. For example, wireless devices 110A-C may transmit wireless signals to radio network nodes 115A-C and/or receive wireless signals from radio network nodes 115A-C. The wireless signals may contain voice traffic, data traffic, control signals, and/or any other suitable information.

Radio network nodes 115A-C may interface with radio network controller 120. Radio network controller 120 may control radio network nodes 115A-C and may provide certain radio resource management functions, mobility management functions, and/or other suitable functions. Radio network controller 120 may interface with core network node 130. In certain embodiments, radio network controller 120 may interface with core network node 130 via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, core network node 130 may manage the establishment of communication sessions and various other functionality for wireless devices 110A-C. Wireless devices 110A-C may exchange certain signals with core network node 130 using the non-access stratum layer. In non-access stratum signaling, signals between wireless device 110 and core network node 130 may be transparently passed through the radio access network. Example embodiments of wireless devices 110A-C, radio network nodes 115A-C, and a core network node controller 120 or core network node 130 are described with respect to FIGS. 2, 4, and 6, respectively.

As described with respect to FIG. 1 above, embodiments of network 100 may include one or more wireless devices 110A-C, and one or more different types of network nodes capable of communicating (directly or indirectly) with wireless devices 110A-C. Examples of the network nodes include radio network nodes 115A-C, 120, and core network nodes 130. The network may also include any additional elements suitable to support communication between wireless devices 110A-C or between a wireless device 110A-C and another communication device (such as a landline telephone).

Wireless devices 110A-C, radio network nodes 115A-C, and core network node 130 may use any suitable radio access technology, such as long term evolution (LTE), LTE-Advanced, UMTS, HSPA, Global System for Mobile Communication (GSM), cdma2000, WiMax, WiFi, another suitable radio access technology, or any suitable combination of one or more radio access technologies. For purposes of example, various embodiments may be described within the context of certain radio access technologies, such as WCDMA. However, the scope of the disclosure is not limited to the examples and other embodiments could use different radio access technologies. Each of wireless devices 110A-C, radio network nodes 115A-C, radio network controller 120, and core network node 130 may include any suitable combination of hardware and/or software. Examples of particular embodiments of wireless devices 110A-C, radio network nodes 115A-C, and network nodes (such as radio network controller 120 or core network node 130) are described with respect to FIGS. 2, 5, and 8 below, respectively.

Multi-Carrier or Carrier Aggregation Concept

Certain embodiments may include a multicarrier or carrier aggregation (CA) operation. In a multicarrier or CA operation, a wireless device 110A-C may be able to receive and/or transmit data to and from more than one serving cells. In other words, in a CA capable, wireless device 110A-C may be configured to operate with more than one serving cell.

The carrier of each serving cell may be generally called a component carrier (CC). In simplest terms, the component carrier (CC) may mean an individual carrier in a multi-carrier system. The term carrier aggregation (CA) may also be interchangeably referred to as a "multi-carrier system", "multi-cell operation", "multi-carrier operation", "multi-carrier" transmission and/or reception. This means the CA is used for transmission of signaling and data in the uplink and downlink directions. One of the CCs is designated as the primary component carrier (PCC) or simply primary carrier or even anchor carrier. The remaining ones are designated as secondary component carrier (SCC) or simply secondary carriers or even supplementary carriers. The serving cell may be interchangeably referred to as primary cell (PCell) or primary serving cell (PSC). Similarly the secondary serving cell may be interchangeably referred to as secondary cell (SCell) or secondary serving cell (SSC).

Generally the primary or anchor CC carries the essential wireless device 110A-C specific signaling and is the carrier where the wireless device A-C performs radio link monitoring. The primary CC (aka PCC or PCell) exists in both uplink and downlink directions in CA. In case there is single UL CC the PCell must be on that CC. The network may assign different primary carriers to different wireless devices 110A-C operating in an area within radio coverage of the same sector or cell.

Multi-Carrier SCell Setup or Release Procedure

As used herein, multi-carrier SCell setup may refer to a procedure which enables the network node 115A-C to at least temporarily setup or release the use of an SCell, in downlink (DL) and/or uplink (UL) by the CA capable wireless device 110A-C. In particular embodiments, the SCell setup or release procedure or command may include any one or more of:
Configuration of SCell(s) aka SCell addition
De-configuration of SCell(s) aka SCell release
Activation of SCell(s)
Deactivation of SCell(s)
These set up or release procedures, according to certain embodiments, are described below:

Configuration and De-Configuration of SCell

In certain embodiments, the configuration procedure (i.e. addition/release of SCell) may be used by the serving radio network node 115A (e.g. eNode B in LTE or Node B in HSPA) to configure a CA wireless device 110 capable with one or more SCells (DL SCell, UL SCell or both). On the other hand, the de-configuration procedure may be used by the radio network node 115A (e.g. eNode B) to de-configure or remove one or more already configured SCells (DL SCell, UL SCell or both). The configuration or de-configuration procedure may also be used to change the current multi-carrier configuration (e.g. for increasing or decreasing the number of SCells or for swapping the existing SCells with new ones, in particular embodiments). The configuration and de-configuration may be done by the radio network node such as eNode B and/or by Radio Network Controller (RNC) 120 using RRC signaling in LTE and HSPA, respectively.

Activation and Deactivation of Secondary Cells

In certain embodiments, the serving radio network node 115A-C (e.g. eNode B in LTE or Node B in HSPA) may activate one or more deactivated SCells or deactivate one or more SCells on the corresponding configured secondary carriers. The PCell may always be activated. In a particular embodiment, the configured SCells may be initially deactivated upon addition and after a cell change (e.g., handover). In HSPA, the activation and deactivation command may be sent by network node 115A-C via HS-SCCH, according to a particular embodiment. In LTE, the activation and deactivation command may be sent by the eNode B 115A-C via MAC control element (MAC-CE). The deactivation of SCell may save battery power of wireless device 110A-C.

SCell Activation and Deactivation Delay Requirements

According to previous techniques, SCell activation and deactivation delay requirements exist only for one SCell as explained below:
SCell activation delay: The delay within which the wireless device 110A-C shall be able to activate the deactivated SCell may depend upon the specified conditions. Upon receiving SCell activation command in subframe n, the wireless device 110A-C may be capable to transmit valid CSI report for the SCell being activated no later than in subframe n+24 provided certain pre-defined conditions are met for the SCell. Otherwise upon receiving the SCell activation command in subframe n, the UE shall be capable to transmit valid CSI report for the SCell being activated no later than in subframe n+34 provided the SCell can be successfully detected on the first attempt. The valid CSI is based on the UE measurement and corresponds to any pre-defined CQI value with the exception of CQI index=0 (out of range)
SCell deactivation delay: Upon receiving SCell deactivation command or upon expiry of the sCellDeactivation-Timer in subframe n, wireless device 110A-C shall accomplish the deactivation actions for the SCell being deactivated no later than in subframe n+8.

Interruption Due to SCell Setup or Release Procedure or Measurements

In particular embodiments, the setup or release of an SCell (i.e. when the SCell is configured, de-configured, activated or deactivated) may cause glitch or interruption of operation on the PCell or any other activated SCell. The setup or release of the SCell, may cause an interruption in the reception and/or transmission of signals on the PCell or another activated SCell. The glitch in UL and/or DL typically occurs when wireless device 110A-C has a single radio chain to receive and/or transmit more than one CC. However the glitch may also occur when wireless device 110A-C has independent radio chains on the same chip. The glitch mainly occurs when the carrier aggregation (CA) capable a wireless devices 110A-C changes its reception and/or transmission bandwidth (BW) from single-carrier to multiple-carrier operation or vice versa. In order to change the BW, wireless device 110A-C may have to reconfigure its RF components in the RF chain e.g. RF filter, power amplifier (PA), etc, according to certain embodiments. The interruption may vary between 2-5 ms, according to a particular embodiment. The interruption may be due to several factors including RF tuning to reconfigure BW (i.e. shorten or extend), setting or adjusting of radio parameter such as AGC setting etc.

According to a particular embodiment, however, an interruption on PCell of up to 5 subframes may be allowed for intra-band CA when either of the SCell setup or release procedure is executed by wireless device 110A-C. However an interruption on PCell of up to 1 subframe may be allowed for inter-band CA when either of the SCell setup or release procedure is executed by wireless device 110A-C.

During the interruption period, wireless device 110A-C may not receive from and/or transmit any signal or information to the network 130, according to certain embodiments. During the interruption, wireless device 110A-C may not be able to perform measurements due to its inability to receive and/or transmit signals. This may lead to the loss or dropping of packets transmitted between wireless device 110A-C and its serving cell network node 115A. It should be noted that the interruption may impact several or all active carriers, and may affect both the uplink and downlink.

In certain embodiments, the SCell activation and deactivation delay requirements may be defined for wireless device 110A-C which supports only one SCell in at least DL. This means when such wireless device 110A-C is configured with the SCell activates or deactivates, this SCell is not affected by any other serving cell, as the PCell can never be deconfigured or deactivated.

However, for a wireless device 110A-C capable of more than one SCell, the activation or deactivation of any of the SCell can be interfered by the setup or release of another SCell. The behavior of the wireless device 110A-C operating in this scenario is undefined. The consequence may be that the wireless device 110A-C is not be able to complete the ongoing SCell activation or deactivation procedure. This may result in that under such situation the network node may not be able to use the SCell. To avoid such a situation, there is risk that certain network implementation keeps all SCells in activated state even though all of them are not needed all the time. This in turn will degrade wireless device 110A-C battery life and may also require more processing resources in network node 115A-C. Therefore it is important that wireless device behavior with respect to activation and deactivation of SCell for the wireless device 110A-C supporting more than one SCell be well defined, according to particular embodiments.

According to particular embodiments, the following will be elaborated on below:
  Description of a scenario involving SCell setup or release
  Method in a wireless device 110A-C of adapting procedure to meet requirements for setting up or release of two or more SCells
  Method in a network node of adapting setting up or release of SCell(s)

The described embodiments may be applicable to any RAT or multi-RAT systems, which involve measurement without gaps and/or multi-carrier operation. For example, the described embodiments may be applicable to LTE Frequency Division Duplex (FDD)/Time Division Duplex (TDD), WCDMA/HSPA, GSM, GSM Enhanced Data rates for GSM Evolution (GSM EDGE), Radio Access Network (GERAN), Wi Fi, and Code Division Multiple Access 2000 (CDMA2000). The embodiments may also applicable to procedures or radio operations performed by wireless device 110A in any Radio Resource Control (RRC) state. For example, embodiments may be applicable to a RRC connected state, CELL_DCH state, idle state, idle mode, CELL_PCH, URA_PCH, CELL_FACH, or other RRC state.

Figure 2:
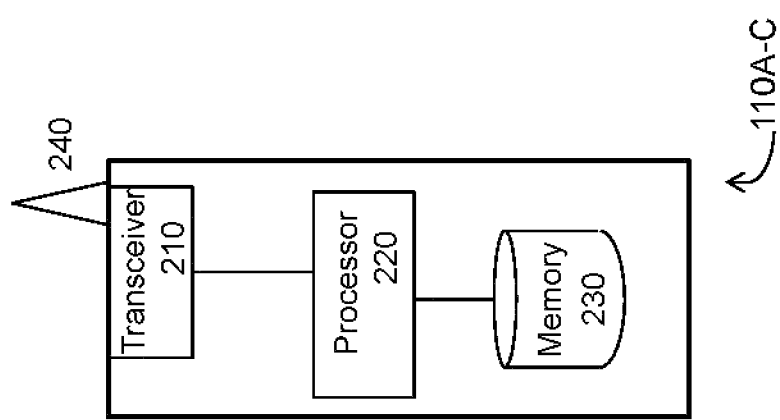
FIG. 2 is a block diagram illustrating an exemplary wireless device for activating and deactivating multiple secondary cells, according to particular embodiments.

In some embodiments, non-limiting term user equipment (UE) may also be used to refer to wireless device 110A-C. In various embodiments, the UE herein can be any type of wireless device capable of communicating with network node or another UE over radio signals. FIG. 2 is a block diagram illustrating an exemplary wireless device 110A, according to certain embodiments. Examples of wireless device 110A-C include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or another device that can provide wireless communication. Wireless device 110A may also be a radio communication device, target device, device to device UE, machine type UE or UE capable of machine to machine communication, a sensor equipped with UE, iPAD, Tablet, mobile terminals, smart phone, laptop embedded equipped (LEE), laptop mounted equipment (LME), USB dongles, Customer Premises Equipment (CPE) etc. Though the terms UE and wireless device 110A-C are used predominantly herein, the equipment may also be referred to as a station (STA), a device, or a terminal in some embodiments. As depicted, wireless device 110A includes transceiver 210, processor 220, memory 230, and antenna 240.

In some embodiments, transceiver 210 facilitates transmitting wireless signals to and receiving wireless signals from radio network node 120 (e.g., via antenna 240), processor 220 executes instructions to provide some or all of the functionality described above as being provided by wireless device 110A, and memory 230 stores the instructions executed by processor 220.

Processor 220 may include any suitable combination of hardware and software implemented in one or more modules to execute instructions and manipulate data to perform some or all of the described functions of wireless device 110A. In some embodiments, processor 220 may include, for example, one or more computers, one or more central processing units (CPUs), one or more microprocessors, one or more applications, and/or other logic.

Memory 230 is generally operable to store instructions, such as a computer program, software, an application including one or more of logic, rules, algorithms, code, tables, etc. and/or other instructions capable of being executed by a processor. Examples of memory 230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110A may include additional components beyond those shown in FIG. 2 that may be responsible for providing certain aspects of the wireless device's functionality, including any of the functionality described above and/or any additional functionality (including any functionality necessary to support the solution described above).

Returning to FIG. 1, one example scenario includes a wireless device 110A being served by a first network node 115A with a PCell 140A operating on a first carrier frequency (f1) and wireless device 110A also being capable of being served by at least two secondary serving cells (SCells) 150A and 150B. In the depicted example embodiment, wireless device 110A is capable of being served by network node 115B on a first SCell 150A and network node 115C on a second SCell 150B. The at least two SCells 150A-B may comprise of a first SCell 150A operating on a second carrier frequency (f2) and a second SCell 150B operating on a third carrier frequency (f3). In some embodiments, wireless device 110A may also be capable of being served by a third SCell (not shown) operating on carrier frequency (f4) The carrier f1 is interchangeably called as PCC while carriers f2, f3 and f3 may interchangeably be called as SCC1, SCC2 and SCC3 respectively.

The termed 'served or being served' herein means that wireless device 110 A is configured with the corresponding cell and can receive from and/or transmit data to the associated network node on the serving cell e.g. on PCell 140A or any of the SCells 150A-B. The data may be transmitted or received via physical channels such as, for example, PDSCH in DL, PUSCH in UL, or any other suitable physical channel.

The wireless device 110A may be requested to setting up or release one or more SCells 150A-B as follows:
  Receiving a first SCell 150-A setup or release request message or command from a second network node 115B for setting up or releasing the first SCell 150A;
  Receiving a second SCell 150B setup or release request message or command from a third network node 115C for setting up or releasing the second SCell 150B;
  Receiving a third SCell (not shown) setup or release request message or command from a fourth network node (not shown) for setting up or releasing the third SCell;

The embodiments are described for at least two SCells or in some cases for three SCells or some cases for any number (N) of SCells. However the embodiments are applicable to any number (N) of SCells.

In certain embodiments, at least some of the first, second, third and fourth network nodes 115B-C are the same or are co-located at the same site or location. For example in such embodiments wireless device 110A may receive one or more messages or commands for setting up or releasing one or more SCells 150A-B from first network node 115A. Also, for example, wireless device 110A may receive one or more messages for setting up or releasing one or more SCells 150A-B from the PCell 140A in such embodiments.

In some embodiments, any combination of the first, second, third and fourth network nodes 115A-C may be different and may be located at different sites or location or may be logically different nodes that may still be co-located. In such embodiments, wireless device 110A may receive one or more messages for setting up or releasing one or more SCells 150A-B from the respective SCells.

In some embodiments, the SCell setup or release message may comprise of one or more of the following:
  Configuration of the SCell or SCell addition
  De-configuration of the SCell or SCell release
  Activation of the SCell
  Deactivation of the SCell In some embodiments, one or more SCell setup or release messages may be received by wireless device 110A via RRC signaling. In some embodiments, one or more SCell setup or release messages may be received by wireless device 110A via MAC CE command.

In certain embodiments, wireless device 110A shall have capability to follow the frame timing change of the connected network node 115A. The uplink frame transmission takes place $(N_{TA}+N_{TA\ offset})\times T_s$ before the reception of the first detected path (in time) of the corresponding downlink frame from the reference cell. Wireless device 110A shall be configured with a pTAG containing the PCell. The pTAG may also contain one SCell or two SCells, if configured. A wireless device 110A capable of supporting multiple timing advance [2] may also be configured with one sTAG, in which case:
  the pTAG shall contain one PCell and the sTAG shall contain one SCell with configured uplink or
  the pTAG shall contain one PCell and the sTAG shall contain two SCells with configured uplink
  the pTAG shall contain one PCell and one SCell and the sTAG shall contain one SCell with configured uplink In pTAG, wireless device 110A may use PCell 140A as the reference cell for deriving the UE transmit timing for cells in the pTAG. When wireless device 110A capable of supporting multiple timing advance [2] is configured with an sTAG, wireless device 110A may use the activated SCell 150A-B from the sTAG for deriving the UE transmit timing for cell in the sTAG. UE initial transmit timing accuracy, maximum amount of timing change in one adjustment, minimum and maximum adjustment rate are defined in the following requirements. The requirements in clause 7 apply to both TAGs.

As described above, wireless device 110A may include an adapted procedure to meet requirements for setting up or release of two or more SCells 150A-B, according to certain embodiments. In a particular embodiment, it may be assumed that the second network node 115B, which may or may not be different from the first network node 115A, sends the first SCell 150A setup or release message to wireless device 110A to perform setup or release of the first SCell 150A. Wireless device 110A may determine whether it has received the first message. Upon determination wireless device 110A has received the first message, wireless device 110A may perform the setting up or release of the first SCell 150A according to the received request. Wireless device 110A may then further determine if wireless device 110A has also received the second SCell setup or request message from the third network node 115C or not. Additionally or alternatively, wireless device 110A may also determine if it has received at third SCell setup or request message from the fourth network node (not shown), in some embodiments.

Depending upon the above determinations, wireless device 110A may perform the setting up or release of the first SCell according to the following rules as described below:
  1. If wireless device 110A determines that it has received only first message to setup or release only the first SCell 150A (i.e. no request for setting up or release of any additional SCell beyond the first SCell 150A) then wireless device 110A performs the setting up or release of the first SCell 150A according to a least one first pre-defined requirement. Example of the first pre-defined requirement is the first time duration or delay (T1). For example, wireless device 110A may be required to successfully complete the SCell setup or release of the first SCell 150A over the time duration T1. In some embodiments, there may be two or more pre-defined requirements such as time duration (T11) and time duration (T12) where T11 and T12 are to be met under different pre-defined conditions. Examples of pre-defined conditions may include whether wireless device 110A has measured first SCell 150A or not over the last certain time period (e.g. 5 seconds), whether wireless device 110A is synchronized to first SCell 150A or not, or other suitable pre-defined conditions. For example, upon receiving the SCell setup or release message in subframe n, wireless device 110A may complete the setting up or release of first SCell 150A in subframe n+24 (i.e. T11=24 ms) if one or more first pre-defined conditions are met. In another example, upon receiving the SCell setup or release message in subframe n, wireless device 110A may complete the setting up or release of first SCell 150A in subframe n+34 (i.e. T12=34 ms) if one or more second pre-defined conditions are met. Upon successful completion of the setting up or release of first SCell 150A, wireless device 110A may send one or more pre-defined UL signals, e.g. CSI, SRS etc, or a message to indicate that first SCell 150A is setup or released.

2. On the other hand, if wireless device 110A determines that it has also received at least the message to setup or release the second SCell 150B while first SCell 150A is being setup or release then wireless device 110A performs the setting up or release of first SCell 150A according to at least one second pre-defined requirement. In other words, wireless device 110A may alter or adapt or modify or change or extend one or more procedure related to the SCell setup or release in order to meet one or more second pre-defined requirements. For example, wireless device 110A may use a first procedure and is required to meet first set of pre-defined requirements when wireless device 110A performs first SCell setup or release without receiving request for performing any other SCell setup or release. On the other hand, wireless device 110A uses a second procedure and is required to meet second set of pre-defined requirements when wireless device 110A performs first SCell setup or release while receiving request for performing at least on more SCell setup or release. Example of the second pre-defined requirement is the second time duration or delay (T1). For example, in this case, wireless device 110A is required to successfully complete the SCell setup or release of first SCell 150A over the time duration T2. In some embodiments there may be two or more second pre-defined requirements such as time duration (T21) and time duration (T22) where T21 and T22 are to be met under different pre-defined conditions as described in Step 1 above. The pre-defined time duration T2 is at least the function of T1 and T2>T1. Similarly T21 and T22 are function of T11 and T12 respectively and T21>T11 and T22>T12. In some embodiments, if wireless device 110A determines that it has also received at least the message to setup or release the second SCell 150B while first SCell 150A is being setup or released, then wireless device 110A may partially or fully restart the setting up or release of first SCell 150A. In another example, wireless device 110A may delay the set-up or release of second SCell 150B until after the first SCell set-up or release is completed. Furthermore, in this example, wireless device 110A may be allowed to extend the maximum allowed time for the setup/release of the second SCell 150B since the request for the setup/release of the SCell was received while the setup/release of the first SCell 150A was not completed.

Several general and specific examples of the time duration T2 are provided as follows:

Example 1: An example of a general expression for T2 as a function of at least T1 is expressed by (1):

$$T2=g(T1,K,D,\Delta) \quad (1)$$

where:

K is the number of times wireless device 110A is requested to perform setting up or releasing at least the second SCell 150B while (i.e. during the time) the first SCell 150A is being setup or released by wireless device 110A;

K may or may not be different for activation/deactivation of the first SCell 150A and configuration/deconfiguration of the first SCell K=1 may cover both DL and UL (e.g., for one SCell activation/deactivation when both DL and UL exist, unlike for downlink only frequency band e.g. LTE FDD band 30)

K=1 may be any of: only DL, both DL and UL, and only UL (e.g., for one SCell configuration/deconfiguration)

D is the interruption due to the setting up or release of the at least second SCell (UL, DL or both) and;

$\Delta$ is the additional margin to account for all interruptions and/or UE implementation margin and where $\Delta \geq 0$. The parameter $\Delta$ (here and also in other examples below) may also account for whether there is an on-going setup/release procedure for a third SCell at the time when the request for the setup/release of the first SCell was received.

It can also be observed that function g (above and also in the other examples below) is a function of the number of SCells 150A-B, implicitly (e.g., through the K parameter) or explicitly (e.g., T2=g(T1, n, K, D, $\Delta$), where n is the number of SCells or a function thereof. In another example, when the number of SCells is three, the time T3 may be a function of T2, etc.: T3=g(T2, K, D, $\Delta$), where K is the number of times the UE is requested to perform setting up or releasing at least the third SCell while (i.e. during the time) the first SCell 150A is being setup or released by the UE, D is the interruption due to the setting up or release of the at least third SCell, and $\Delta$ is an additional margin.

The above expression can also be generalized for T21 and T22 by (2) and (3) as follows:

$$T21=g(T11,K,D,\Delta) \quad (2)$$

$$T22=g(T12,K,D,\Delta) \quad (3)$$

Example 2: Another example of a general expression for T2 as a function of at least T1 is expressed by (4):

$$T2=g(T1,Ki,Di,\Delta i) \quad (4)$$

Where;

Ki is the number of times wireless device 110A is requested to perform setting up or releasing the $i^{th}$ SCell while (i.e. during the time) the first SCell 150A is being setup or release by wireless device 110A, where $i^{th}$ SCell is different than the first SCell 150A;

Di is the interruption due to the setting up or release of the $i^{th}$ SCell and;

$\Delta i$ is the additional margin to account for interruption due to setting up or release of the $i^{th}$ SCell and/or wireless device 110A implementation margin and where $\Delta \geq 0$.

Example 3: Yet another example of a general expression for T2 as a function of at least T1 is expressed by (5):

$$T2=g(T1,Kij,Dij,\Delta ij) \quad (5)$$

Where:
K is the number of times wireless device 110A is requested to perform a particle type of SCell message (j) for setting up or releasing the $i^{th}$ SCell while (i.e. during the time) the first SCell 150A is being setup or release by wireless device 110A, where $i^{th}$ SCell is different than the SCell 150A;

Dij is the interruption due to the particle type (j) of setting up or release of the $i^{th}$ SCell and;

Δi is the additional margin to account for interruption due to particle type (j) of setting up or release of the $i^{th}$ SCell and/or wireless device 110A implementation margin and where Δ≥0.

Examples of particle type (j) of setting up or release of SCell is activation, deactivation, configuration or deconfiguration of the SCell.

Example 4: Yet other examples of general expressions for T2 as a function of at least T1 are expressed by (6), (7) or (8):

$$T2=T1+g(K,D,\Delta) \quad (6)$$

$$T2=T1+g(Ki,Di,\Delta i) \quad (7)$$

$$T2=T1+g(Kij,Dij,\Delta ij) \quad (8)$$

Examples of specific expressions for T2 as a function of at least T1 are expressed by (9) or (10):

$$T2=T1+K*D+\Delta \quad (9)$$

$$T2=T1+K1*D1+K2*D2+\Delta 1+\Delta 2 \quad (10)$$

Where:
K1 correspond to number of times wireless device 110A receives activation or deactivation commands for activating or deactivating at least one SCell other than the first SCell 150A while (i.e. during the time) wireless device 110A is activating or activating the first SCell 150A.

K2 correspond to number of times wireless device 110A receives configuration or deconfiguration message for configuring (addition) or deconfiguring (release) at least one SCell other than the first SCell 150A while (i.e. during the time) wireless device 110A is activating or activating first SCell 150A.

D1 is the interruption due to the activation or deactivation of the at least one SCell other than the first SCell 150A and;

D2 is the interruption due to the configuration or deconfiguration of the at least one SCell other than the first SCell 150A;

Δ1 is the additional margin to account for all interruptions and/or wireless device 110A implementation margin due to activation or deactivation of the at least one SCell other than the first SCell 150A and where Δ1≥0.

Δ2 is the additional margin to account for all interruptions and/or wireless device 110A implementation margin due to configuration or deconfiguration of the at least one SCell other than the first SCell 150A and where Δ2≥0.

Yet other examples of specific expressions for T2 as a function of at least T1 are expressed by (11), (12) and (13):

$$T2=K*T1+\Delta \quad (11)$$

$$T2=(K1+K2)*T1+\Delta 1+\Delta 2 \quad (12)$$

The examples in (11)-(13) correspond to the case where wireless device 110A restarts the SCell setup or release procedure for the first SCell 150A after receiving each SCell setup or release message for setting up or release of additional SCells, such as SCell 150B.

In any of the above examples for adapting or altering the procedure to meet the second pre-defined requirements, wireless device 110A may have to store the signals obtained from the first SCell 150A during the interruptions due to setting up or release of other SCells such as SCell 150B. For the purpose of setting up or release of first SCell 150A, wireless device 110A may reuse the old signals or use only new signals from first SCell 150A after the interruption. For example in some cases, wireless device 110A may combine the old and the new signals after the interruptions (e.g. examples in expressions 6-10). In this case, wireless device 110A may have to store the previous signals impacting the memory. But in case of expressions (11-12), wireless device 110A may discard the old signals obtained before each interruption and use only the latest ones after the interruptions. In this case, wireless device 110A does not have to store the previous signals i.e. those obtained before the interruption.

Figure 3:
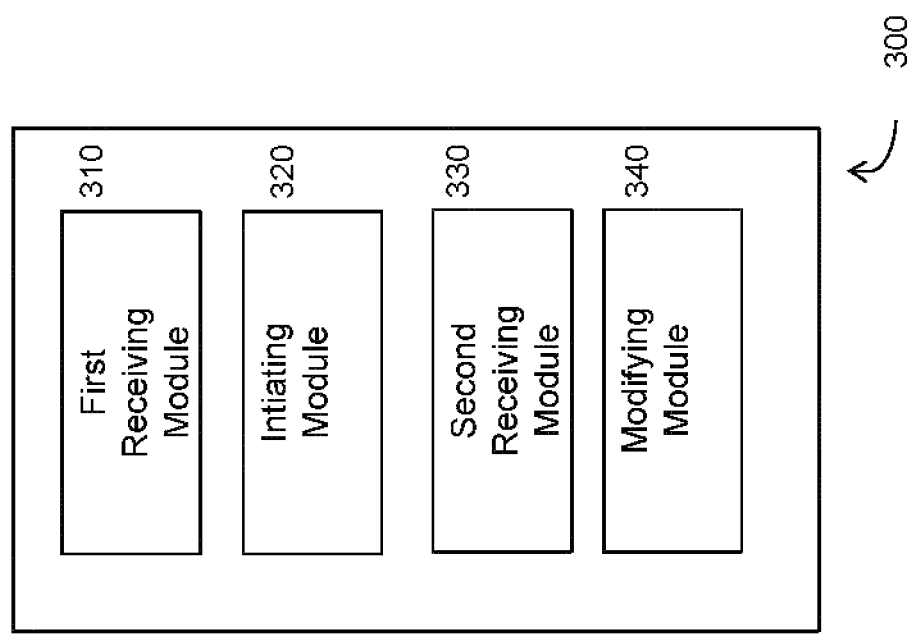
FIG. 3 is a block diagram illustrating embodiments of an exemplary wireless device operating as a computer networking virtual apparatus, according to certain embodiments.

In certain embodiments, wireless device 110A-C may operate as a computer networking virtual apparatus. FIG. 3 is a block diagram illustrating an exemplary wireless device operating as a computer networking virtual apparatus 300. As depicted, the virtual apparatus 300 includes at least one first receiving module 310, an initiating module 320, a second receiving module 330, and a modifying module 340. The first receiving module 330 is configured to perform at least a portion of the receiving functions of wireless device 110, as described herein. For example, first receiving module may receive a first message requesting activation or deactivation of a first SCell 150A for a first carrier.

Initiating module 320 may be configured to perform the operations of virtual apparatus 300 for initiating a first procedure to activate or deactivate the first SCell 150A, as described herein. In certain embodiments, the wireless device 110A may have a first delay period (Tactivate_basic) within which the wireless device 110A is to complete the first procedure.

Second receiving module 330 may be configured to receive a second message while performing the first procedure to activate or deactivate first SCell 150A. In certain embodiments, for example, the second message may be a request to activate, deactivate, configure, or deconfigure a second SCell 150B for a second carrier.

Modifying module 340 may be configured to modify the first procedure in response to the second message to activate, deactivate, configure, or deconfigure second SCell 150B. In certain embodiments, modifying the first procedure may include replacing the first delay period with a second delay period (Tactivate_total) within which wireless device 110A is to complete the first procedure to activate or deactivate the first SCell 150A. In certain embodiments, the second delay period (Tactivate_total) may be greater than the first delay period (Tactivate_basic).

Figure 4:
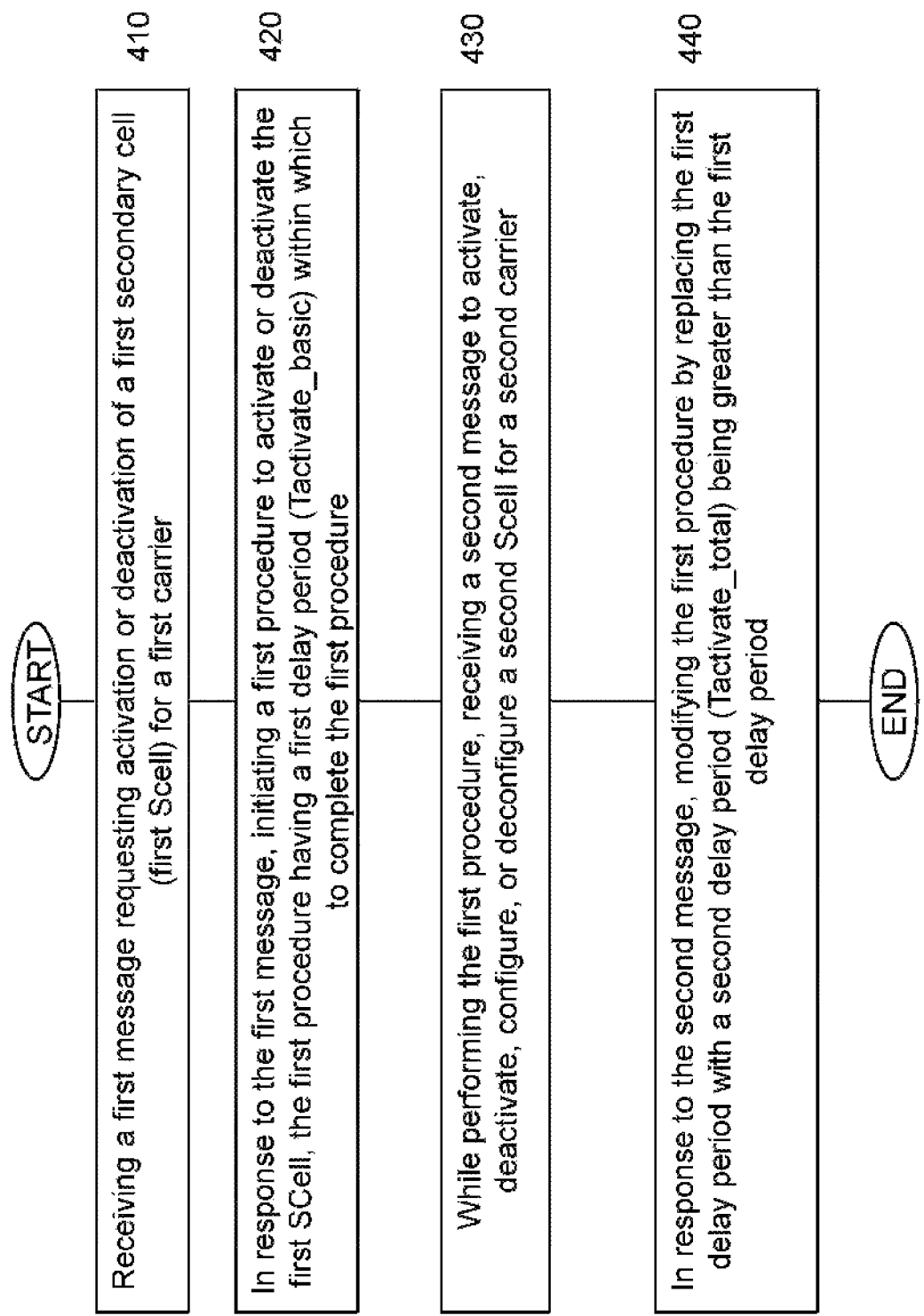
FIG. 4 is a flow chart illustrating an exemplary method for activating and deactivating multiple secondary cells by a wireless device, according to particular embodiments.

FIG. 4 is a flow chart illustrating an exemplary method for activating and deactivating multiple SCells 150A-B by a wireless device 110A-C and/or by a computer networking virtual apparatus 300, according to particular embodiments. The method begins at step 410 when a wireless device receives a first message requesting activation or deactivation of a first SCell 150A for a first carrier. In various particular embodiments, the first message may request or command wireless device 110A to perform at least one of a configuration of first SCell 150A, an addition of first SCell 150A, a de-configuration of first SCell 150A, a release of first SCell 150A, activation of first SCell 150A, and deactivation of first SCell 150A.

In particular embodiments, the first message requests wireless device 110A to configure or deconfigure first SCell 150A and the first message is received by wireless device 110A via RRC signaling. In other particular embodiments, the first message requests the wireless device 110A to activate or deactivate the first SCell 150A and the first message is received by wireless device 110A via MAC CE command or signaling.

The method continues at step 420 when, in response to the first message, wireless device 110A initiates a first procedure to activate or deactivate first SCell 150A. The first procedure may have a first delay period (Tactivate_basic) within which wireless device 110A must complete the first procedure. For example, when one or more predefined requirements are met, Tactivate_basic may be equal to 24 subframes. When one or more predefined requirements are not met, Tactivate_basic may be equal to 34 subframes.

The method continues at step 430 when a second message is received requesting or commanding activation, deactivation, configuration, or deconfiguration of a second SCell 150B for a second carrier while wireless device 110A is performing the first procedure. In response to the second message to activate, deactivate, configure, or deconfigure a second SCell 150B), wireless device 110A may modify the first procedure at step 440 by replacing the first delay period (Tactivate_basic) with a second delay period (Tactivate_total) within which wireless device 110A is to complete the first procedure to activate or deactivate first SCell 150A. In certain embodiments, the second delay period (Tactivate_total) is greater than the first delay period (Tactivate_basic). Thus, where wireless device 110A receives a second message to activate, deactivate, configure, or deconfigure a second SCell 150A while setting up or releasing a first SCell 150A, wireless device 110A is given more time to perform the setup or release procedure.

In a particular embodiments, the second delay period (Tactivate_total) is at least a function of an integer K that is a number of times wireless device is requested to perform activation, deactivation, configuration, or deconfiguration of second SCell 150B while the first procedure is being performed to activate or deactivate first SCell 150A. In a particular embodiment, the second delay period (Tactivate_total) may be expressed as the sum of the first delay period (Tactivate_basic) and the value of K multiplied by 5.

In certain embodiments, wireless device 110A may receive a third message requesting activation, deactivation, configuration, or deconfiguration of a third SCell while performing the first procedure. In a particular embodiment, each message or command may be received from a different network node. For example, the first message may be received from a first network node 115A. However, the second message may be received from second network node 115B and third message may be received from third network node 115C. In some embodiments, the first, second, and third network nodes 115A-C may be co-located at the same site or may be in the same network node. In a particular embodiment, for example, the first second, and third nodes may be received from first network node 115A. Additionally, at least one of the first second and third messages may be received on PCell 140A.

Figure 5:
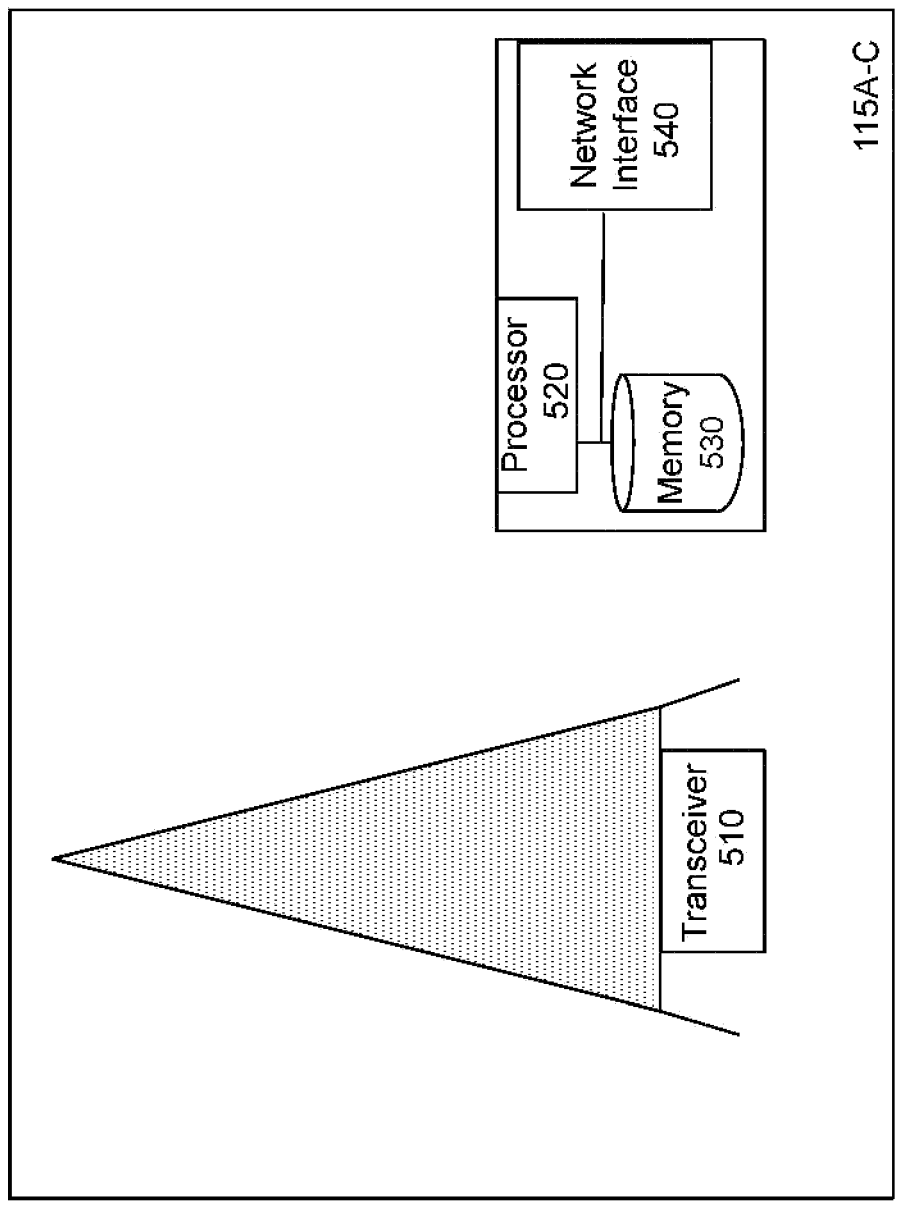
FIG. 5 is block diagram illustrating an exemplary network node, according to particular embodiments.

According to certain embodiments, a radio network node such as network node 115A may be adapted for setting up or releasing of SCells(s). FIG. 5 is a block diagram illustrating certain embodiments of a radio network node 115A-C. Examples of radio network node 115A-C include an eNodeB, a node B, a base station, a wireless access point (e.g., a Wi-Fi access point), a low power node, a base transceiver station (BTS), transmission points, transmission nodes, remote RF unit (RRU), remote radio head (RRH), etc. Radio network nodes 115A-C may be deployed throughout network 100 as a homogenous deployment, heterogeneous deployment, or mixed deployment. A homogeneous deployment may generally describe a deployment made up of the same (or similar) type of radio network nodes 115A-C and/or similar coverage and cell sizes and inter-site distances. A heterogeneous deployment may generally describe deployments using a variety of types of radio network nodes 115A-C having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Radio network nodes 115A-C may include one or more of transceiver 510, processor 520, memory 530, and network interface 540. In some embodiments, transceiver 510 facilitates transmitting wireless signals to and receiving wireless signals from wireless device 510 (e.g., via an antenna), processor 520 executes instructions to provide some or all of the functionality described above as being provided by a radio network node 115A-C, memory 530 stores the instructions executed by processor 520, and network interface 540 communicates signals to backend network components, such as a gateway, switch, router, Internet, Public Switched Telephone Network (PSTN), core network nodes 130, radio network controllers 120, etc.

Processor 520 may include any suitable combination of hardware and software implemented in one or more modules to execute instructions and manipulate data to perform some or all of the described functions of radio network node 115A-C. In some embodiments, processor 520 may include, for example, one or more computers, one or more central processing units (CPUs), one or more microprocessors, one or more applications, and/or other logic.

Memory 530 is generally operable to store instructions, such as a computer program, software, an application including one or more of logic, rules, algorithms, code, tables, etc. and/or other instructions capable of being executed by a processor. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 540 is communicatively coupled to processor 520 and may refer to any suitable device operable to receive input for radio network node 115, send output from radio network node 115, perform suitable processing of the input or output or both, communicate to other devices, or any combination of the preceding. Network interface 540 may include appropriate hardware (e.g., port, modem, network interface card, etc.) and software, including protocol conversion and data processing capabilities, to communicate through a network.

Other embodiments of radio network node 115A-C may include additional components beyond those shown in FIG. 5 that may be responsible for providing certain aspects of the radio network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

Also in some embodiments generic terminology, "radio network node" or simply "network node (NW node)", may be used. The terms may refer to any kind of network node which may comprise of base station, radio base station, base transceiver station, base station controller, network controller, evolved Node B (eNB), Node B, RNC, relay node, positioning node, E-SMLC, location server, repeater, access point, radio access point, Remote Radio Unit (RRU) Remote Radio Head (RRH), multi-standard radio (MSR) radio node such as MSR BS nodes in distributed antenna system (DAS), Self Organizing Node (SON), Operational & Maintenance (O&M), Operational Support System (OSS), MDT node, Core network node, MME etc.

Figure 6:
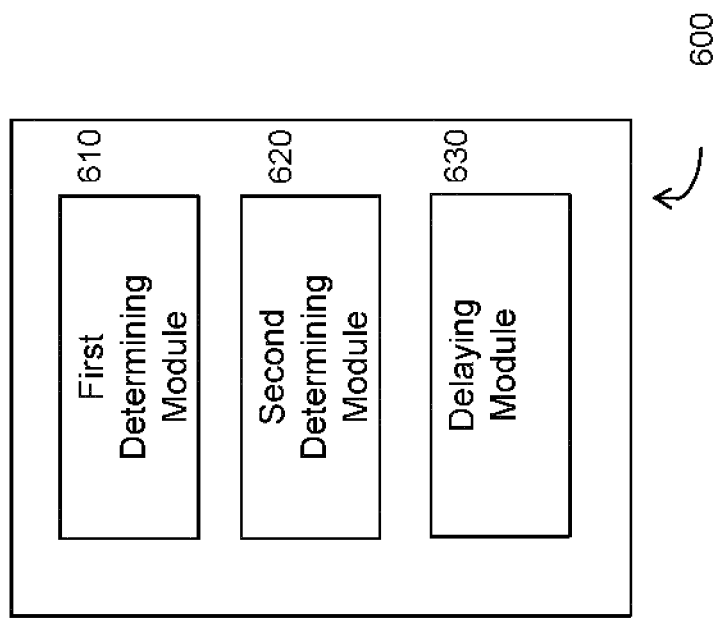
FIG. 6 is a block diagram illustrating embodiments of an exemplary network node operating as a computer networking virtual apparatus, according to certain embodiments.

In certain embodiments, wireless device 115A-C may operate as a computer networking virtual apparatus. FIG. 6 is a block diagram illustrating an exemplary network node operating as a computer networking virtual apparatus 600. As depicted, the virtual apparatus 600 includes at least one first determining module 610, a second determining module 620, and a delaying module 640. The first determining module 610 may be configured to determine that wireless device 110A has received a first message requesting wireless device 110A to activate or deactivate a first SCell 150A for a first carrier.

Second determining module 620 may be configured to determine a delay period (Tactivate_basic) within which the wireless device 110A is to complete the first procedure. For example, the delay period (Tactivate_basic) may be the amount of time in which wireless device 110A must activate or deactivate first SCell 150A.

Delaying module 630 may be configured to delay sending a second message requesting the activation, deactivation, configuration, or deconfiguration of a second SCell 150B. In certain embodiments, the second message may be delayed by an amount of time that is a function of the delay period (Tactivate_basic).

Figure 7:
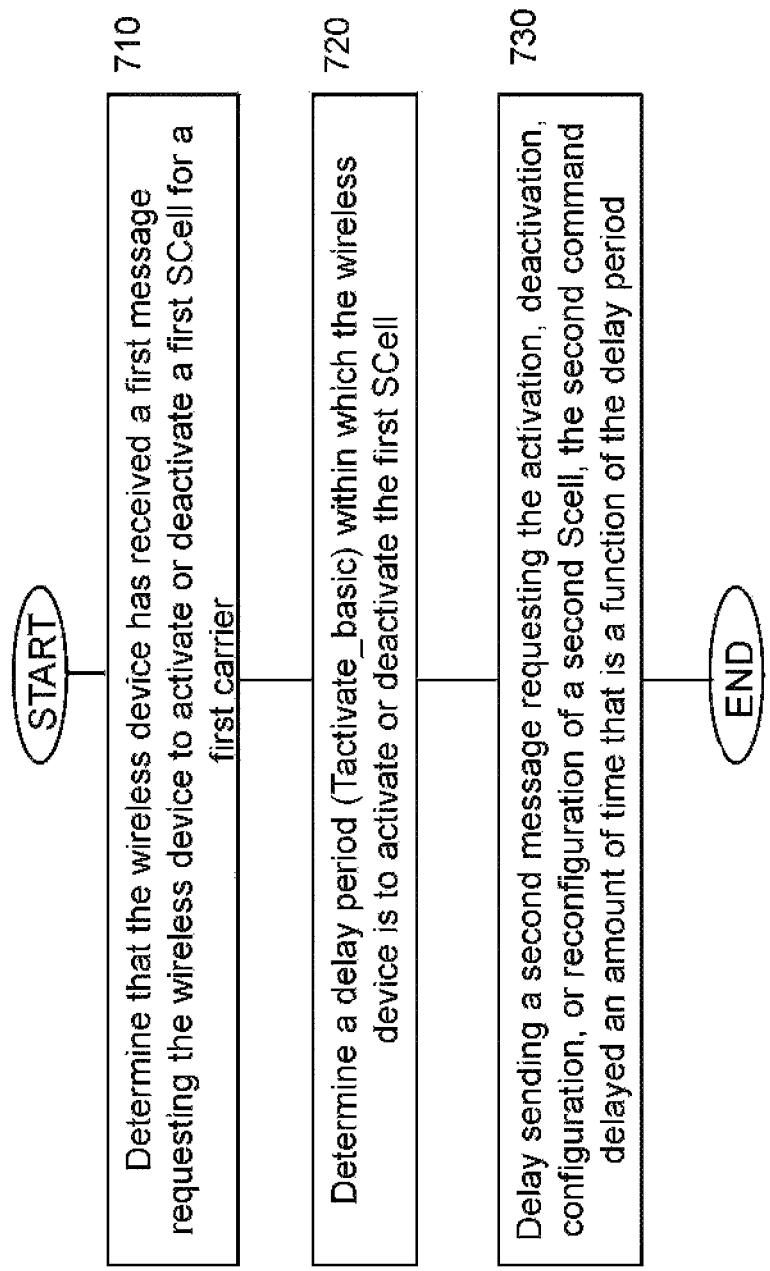
FIG. 7 is a flow chart illustrating an exemplary method for activating and deactivating multiple secondary cells by a network node, according to particular embodiments.

FIG. 7 is a flow chart illustrating an exemplary method for causing the activation and deactivation of multiple secondary cells 150A-B by a network node 115A-C and/or computer networking virtual apparatus 600, according to particular embodiments. In certain embodiments, a network node 115A may intend to send a SCell setup or release message or command to wireless device 110A requesting the wireless device 110A to set up or release one or multiple SCells 150A-B. Network node 115A may, however, delay sending the intended request if wireless device 110A is already setting up or releasing another SCell 150A-B. Thus, a network node 115A may decide whether to send a setup or release command for a second SCell 150B to wireless device 110A based on the determination that wireless device 110A is performing or is expected to perform or has been requested to perform the setting up or release of a first SCell 150A.

The method begins at step 710 with the determination that wireless device 110A has received a first message requesting the wireless device 110A to activate or deactivate a first SCell 150A for a first carrier. In various embodiments, the first message may include a request for wireless device 110A to perform any one or combination of a configuration, addition, de-configuration, release, activation, and deactivation of first SCell 150A.

In certain embodiments, determining that wireless device 110A has received the first message may include receiving an indication from one of network nodes 115A-C that wireless device 110A has been requested to perform or is performing setup or release of first SCell 150A. For example, the indication may be received from first network node 115A associated with PCell 140A. Alternatively, the indication may be received from second network node 115B associated with first SCell 150A or third network node 115C associated with second SCell 150B. In a particular embodiment, where third network node 115C has recently sent a command for SCell setup or release, such information is available in third network node 115C and can be retrieved from its memory.

In other embodiments, the indication may be received from wireless device 110A and may identify that wireless device 110A is performing or expected to perform SCell setup or release of first SCell 150A. The indication from wireless device 110A may be received independently or may be received in response to a request to wireless device 110A for the information.

In still other embodiments, the determination by network node 115A that wireless device 110A has received the first message may be made independently by network node 115A whether or not an indication is received from wireless device 110A or another network node 115B-C. For example, network node 115A may determine that wireless device 110A is performing a setup or release of first SCell 150A when no confirmation or pre-defined signal or a message is received from wireless device 110A indicative of that the set-up or release of first SCell 150A has been completed. For example, in a particular embodiment, a timer in the network node is compared to a threshold or its status is checked (e.g., elapsed/not elapsed) since the UE has been requested to setup or release at least the first SCell.

At step 720, network node 115A determines a delay period (Tactivate_basic) within which wireless device 110A is to activate, deactivate, configure, or deconfigure first SCell 150A. As described above, the delay period (Tactivate_basic) can be determined based on pre-defined information e.g. pre-defined requirements specified in the standard.

At step 730, network node 115A may then delay sending a second message requesting the activation or deactivation of second SCell 150B. In various embodiments, the second message may be delayed by an amount of time that is a function of delay period (Tactivate_basic). In a particular embodiment, the second message may be delayed by a total delay period (Tactivate_total) that is greater than the delay period (Tactivate_basic) by a predefined amount. The determination of the total delay period (Tactivate_total) and the delay period (Tactivate_basic) may be based on a pre-defined rule. By using this method the network node can avoid the situation where setup or release of more than two SCells partly or fully overlaps in time. The consequence of setting up or releasing of more than two SCells over partly or fully overlapping time is known by the pre-defined requirements (see above). Therefore the method in the network node is triggered based on the UE pre-defined requirements for SCell setup or release disclosed above.

In another embodiment, network node 115A may delay the transmission of the second message until network node 115A receives an indication that the first SCell 150A has been setup or released. As described above, the indication may be received from wireless device 110A or from another network node 115B-C. The indication from wireless device 110A may also be comprised of valid UL signals (e.g. CQI with CQI index=non zero). For example, after an amount of time (T3) and/or after receiving the indication, network node 115A may send the second message to wireless device 110A. Examples of T3 include but are not limited to:

T3=T2

T3=T2+α; where α is a margin to account for imperfection and delay.

In a particular embodiment, the method may also include determining that wireless device 110A has received a third message requesting wireless device 110A to activate or deactivate a third SCell. The method may also include determining a total delay period (Tactivate_total) within which wireless device 110A is to complete the activation, deactivation, configuration, or deconfiguration of the third SCcell 150C. The total delay period (Tactivate_total) for activating or deactivating the third SCell may be greater than the delay period (Tactivate_basic) for activating or deactivating the second SCell 150B. In particular embodiments, the combination of first, second, third, and fourth network nodes may be different. The network nodes 115A-C may be located at different sites or locations or one or more of network nodes 115A-C may be at one site or location. Network nodes 115A-C may be logically different nodes that may still be co-located at the same site or in the same network node.

Figure 8:
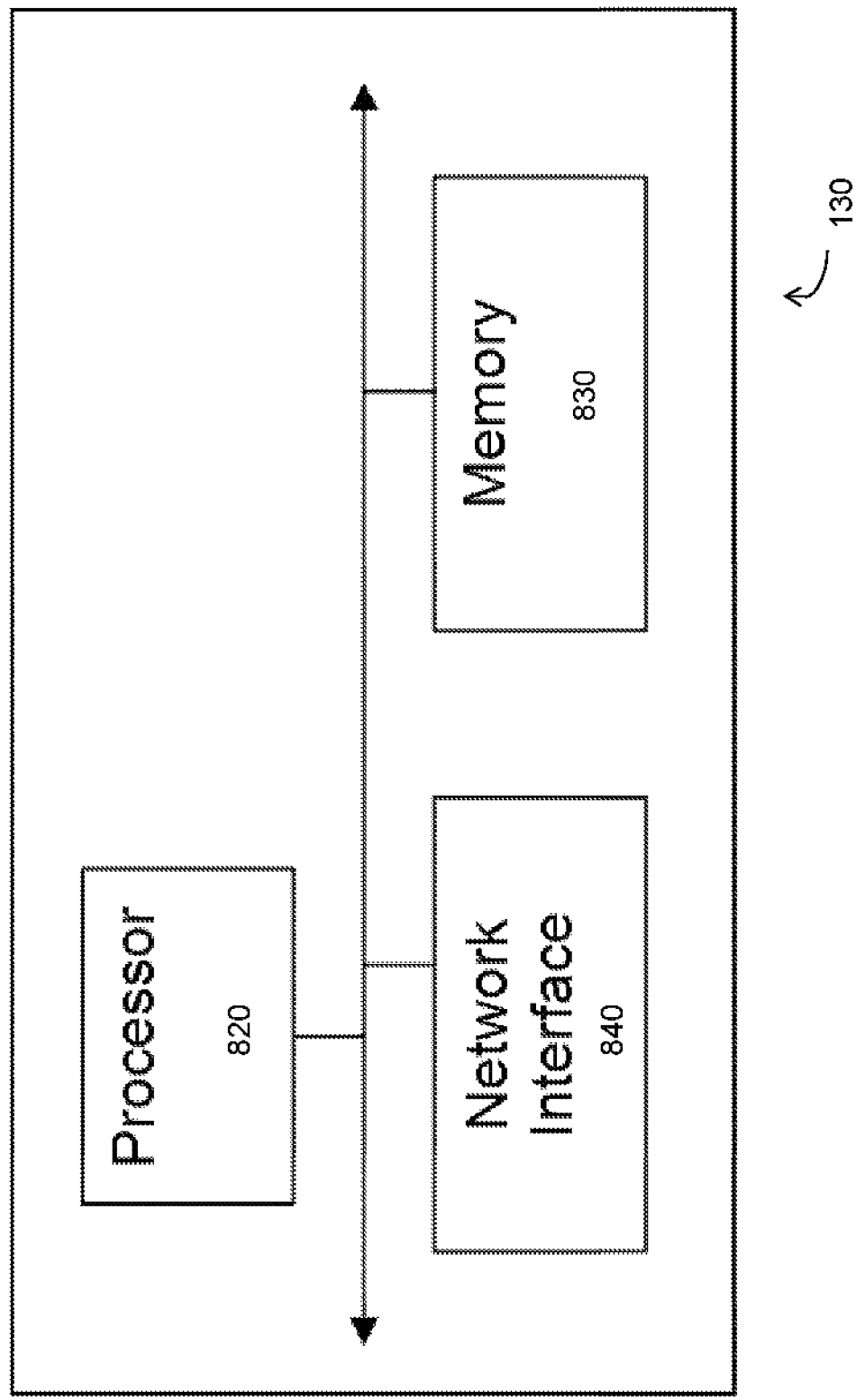
FIG. 8 is a block diagram illustrating an exemplary core network node, according to particular embodiments.

FIG. 8 is a block diagram illustrating certain embodiments of a radio network controller 120 or core network node 130. Examples of network nodes can include a mobile switching center (MSC), a serving GPRS support node (SGSN), a mobility management entity (MME), a radio network controller (RNC), a base station controller (BSC), and so on. The network node includes processor 820, memory 830, and network interface 840. In some embodiments, processor 820 executes instructions to provide some or all of the functionality described above as being provided by the network node, memory 830 stores the instructions executed by processor 820, and network interface 840 communicates signals to a suitable node, such as a gateway, switch, router, Internet, Public Switched Telephone Network (PSTN), radio network nodes 115, radio network controllers 120, core network nodes 130, etc.

Processor 820 may include any suitable combination of hardware and software implemented in one or more modules to execute instructions and manipulate data to perform some or all of the described functions of the network node. In some embodiments, processor 820 may include, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 840 is communicatively coupled to processor 820 and may refer to any suitable device operable to receive input for the network node, send output from the network node, perform suitable processing of the input or output or both, communicate to other devices, or any combination of the preceding. Network interface 840 may include appropriate hardware (e.g., port, modem, network interface card, etc.) and software, including protocol conversion and data processing capabilities, to communicate through a network.

Other embodiments of the network node may include additional components beyond those shown in FIG. 8 that may be responsible for providing certain aspects of the network node's functionality, including any of the functionality described above and/or any additional functionality (including any functionality necessary to support the solution described above).

Some embodiments of the disclosure may provide one or more technical advantages. For example, in certain embodiments, techniques employed may enable the wireless device (i.e., user equipment) to correctly activate or deactivate a SCell while it is requested to activate, deactivate, configure or deconfigure one or more additional SCells. Another technical advantage may be that the techniques may enable the network node to be aware of user equipment performance (e.g. time to perform SCell setup or release) when the user equipment performs setting up or release of more than one SCell during at least partly overlapping time. Still another technical advantage may be that the techniques ensure that the user equipment behavior is well defined and consistent even if the user equipment is requested to setup or release several SCells during at least partly overlapping time. Still another technical advantage may be that the network node does not have to wait for the completion of SCell setup or release for one SCell for setting up or release of another SCell. That is, the network node can independently request the user equipment to perform SCell setup or release for more than one SCells.

Some embodiments may benefit from some, none, or all of these advantages. Other technical advantages may be readily ascertained by one of ordinary skill in the art.

Modifications, additions, or omissions may be made to the methods, systems, and apparatuses disclosed herein without departing from the scope of the invention. For example, the methods may include more, fewer, or other steps, which may be performed in any suitable order. As another example, the components of the systems and apparatuses may be integrated or separated. Additionally, the operations of the systems and apparatuses may be performed by more, fewer, or other components. Furthermore, operations of the systems and apparatuses may be performed using any suitable logic comprising software, hardware, and/or other logic. As used in this document, "each" refers to each member of a set or each member of a subset of a set.

For example, in one example implementation according to a particular embodiment, a method for activating and deactivating multiple secondary cells 150A-B by a wireless device 110A using carrier aggregation to receive signals from a plurality of carriers in a primary cell (PCell) 140A and a plurality of secondary cells SCells 150A-C is provided. A first message requesting activation or deactivation of a first secondary cell (first SCell) 150A for a first carrier is received. In response to the first message, a first procedure is initiated to activate or deactivate the first SCell 150A. The wireless device 110A has a first delay period ($T_{activate\_basic}$) within which to complete the first procedure. While performing the first procedure to activate or deactivate the first SCell 150A, a second message to activate, deactivate, configure or deconfigure a second SCell 150B for a second carrier is received. In response to receiving the second message to activate, deactivate, configure, or deconfigure the second SCell 150B, the first procedure is modified by replacing the first delay period with a second delay period ($T_{activate\ total}$) within which to complete the first procedure to activate or deactivate the first SCell 150A. The second delay period ($T_{activate\ total}$) is greater than the first delay period ($T_{activate\ basic}$).

In another example implementation according to a particular embodiment, a wireless device 110A using carrier aggregation to receive signals from a plurality of carriers in a primary cell (Pcell) 140A and a plurality of secondary cells (SCells) 150A-B includes memory 230 containing executable instructions and one or more processors 220 in communication with the memory 230. The one or more processors 220 are operable to execute the instructions to cause the wireless device 110A to receive a first message requesting activation or deactivation of a first secondary cell (first SCell) 150A for a first carrier. In response to the first message, a first procedure is initiated to activate or deactivate the first SCell 150A. The wireless device 110A has a first delay period ($T_{activate\_basic}$) within which to complete the first procedure. While performing the first procedure to activate or deactivate the first SCell 150A, a second request to activate, deactivate, configure, or deconfigure a second SCell 150B for a second carrier is received. In response to receiving the second message to activate, deactivate, configure, or deconfigure the second SCell 150B, the first procedure is modified by replacing the first delay period with a second delay period ($T_{activate\_total}$) within which to complete the first procedure to activate or deactivate the first SCell 150A. The second delay period ($T_{activate\_total}$) is greater than the first delay period ($T_{activate\_basic}$).

In another example implementation according to a particular embodiment, a method in a first network node 115A serving a wireless device 110A that is using carrier aggregation to receive signals from a plurality of carriers in a primary cell (Pcell) 140A and a plurality of secondary cells (SCells) 150A-B includes determining, by the first network node 115A, that the wireless device 110A has received a first message requesting the wireless device 110A to activate or deactivate a first SCell 150A for a first carrier. A delay period ($T_{activate\ basic}$) within which the wireless device 110A is to activate or deactivate the first SCell 150A is determined by the first network node 115A. First network node 115A delays sending a second message requesting the activation, deactivation, configuration, or deconfiguration of a second SCell 150A. The second message delayed an amount of time that is a function of the delay period.

In another example implementation according to a particular embodiment, a first network node 115A serving a wireless device 110A that uses carrier aggregation to receive signals from a plurality of carriers in a primary cell (Pcell) 140A and a plurality of secondary cells (SCells) 150A-B includes memory 530 containing executable instructions and one or more processors 520 in communication with the memory 530. The one or more processors 520 operable to execute the instructions to cause the first network node 115A to determine that the wireless device 110A has received a first message requesting the wireless device 110A to activate or deactivate a first SCell 150A for a first carrier. A delay period ($T_{activate\_basic}$) within which the wireless device 110A is to activate or deactivate the first SCell 150A is determined. The sending of a second message requesting the activation, deactivation, configuration, or deconfiguration of a second SCell 150B is delayed. The second message is delayed an amount of time that is a function of the delay period.

In another example implementation, a wireless device may operate as a computer networking virtual apparatus. According to a particular embodiment, the apparatus 300 may include a first receiving module 310 configured to receive a first message requesting activation or deactivation of a first secondary cell (first SCell) 150A for a first carrier. An initiating module 320 is configured to initiate a first procedure to activate or deactivate the first SCell 150A in response to the first message. The apparatus 300 has a first delay period ($T_{activate\ basic}$) within which to complete the first procedure. A second receiving module 330 is configured to receive a second message to activate, deactivate, configure, or deconfigure a second SCell 150B for a second carrier while performing the first procedure to activate or deactivate the first SCell 150A. A modifying module 340 is configured to modify the first procedure in response to receiving the second message to activate, deactivate, configure, or deconfigure the second SCell 150B. Modifying the first procedure may include replacing the first delay period with a second delay period ($T_{activate\_total}$) within which to complete the first procedure to activate or deactivate the first SCell 150A. The second delay period ($T_{activate\_total}$) is greater than the first delay period ($T_{activate\_basic}$).

In another example implementation, a network node may operate as a computer networking virtual apparatus. Accord to a particular embodiment, an apparatus 600 includes a first determining module 610 configured to determine that a wireless device 110A has received a first message requesting the wireless device 110A to activate or deactivate a first SCell 150A for a first carrier. A second determining module 620 is configured to determine a delay period ($T_{activate\ basic}$) within which the wireless device 110A is to activate or deactivate the first SCell 150A. A delaying module 630 is configured to delay sending a second message requesting the activation, deactivation, configuration, or deconfiguration of a second SCell 150B. The second message is delayed an amount of time that is a function of the delay period.

In another example implementation for activating and deactivating multiple SCells, a method may be performed by user equipment that is served by a first network node on PCell. If the user equipment, such as wireless device 110A, is capable of using at least two secondary serving cells (SCells) 150A-B, as described above, the method may include receiving a first SCell setup or release message from a second network node 115B for setting up or releasing a first SCell 150A. The first SCell 150A may be set up or released based on the received first SCell setup or release message. A determination may be made as to whether wireless device 110A has received a second SCell setup or release message from a third network node 115C for setting up or releasing a second SCell 150B while setting up or releasing the first SCell 150A. A first procedure or a second procedure may be used or adapted for the setting up or releasing the first SCell 150A based on the determination.

Optionally, the first procedure may be used if wireless device 110A has not received a second SCell setup or release message and the second procedure may be used if wireless device 110A has received a second SCell setup or release message. In a particular embodiment, the first procedure may be used when wireless device 110A meets one or more first pre-defined requirements, and the second procedure may be used when one or more second pre-defined requirements are met. In a particular embodiment, a third SCell setup or release message may be received from a fourth network node for setting up or releasing a second SCell 150B while setting up or releasing the first SCell 150A. In a particular embodiment, the first, second, third and fourth network nodes may be the same or are co-located at the same site. Optionally, the first, second and third SCell setup or release messages may be received on PCell. Optionally, the SCell setup or release message may contain a request for wireless device to perform any one or more of the following tasks: configuration of the SCell or SCell addition, de-configuration of the SCell or SCell release, activation of the SCell, and deactivation of the SCell. In a particular embodiment, the message containing configuration or deconfiguration of the SCell may be received by wireless device 110A via RRC signaling. Alternatively, a message containing activation or deactivation of the SCell may be received by the UE via MAC CE command or signaling.

In a particular embodiment, a first pre-defined requirement may include a first time duration or delay (T1) over which the setting up or releasing of the first SCell 150A is performed by wireless device 110A using the first procedure. Optionally, a second pre-defined requirement may include a second time duration or delay (T2) over which the setting up or releasing of the first SCell 150A is performed by wireless device 110A. In a particular embodiment, T2 may be greater than T1. Additionally, T2 may be a function of T1, K*D and Δ, where K is the number of times wireless device is requested to perform setting up or releasing at least the second SCell 150B while the first SCell 150A is being setup or release by wireless device 110A. D may be the interruption due to the setting up or release of the at least second SCell and Δ may be the additional margin to account for all interruptions.

In another example implementation, a method may be performed by a network node 115A serves wireless device 110A by at least a PCell 140A. The method may include a determination by network node 115A that wireless device 110A is performing or has been requested to perform setting up or release of a first SCell 150A. A first time or delay (Tactivate_basic or T1) over which wireless device 110A performs or is performing the setting up or release of the first SCell may be determined. Network node 115A may delay sending a second SCell setup or release message for setting up or releasing a second SCell 150B to wireless device 110A based on the determined the first time or delay (T1).

In a particular embodiment, the determination that wireless device 110A is performing or has been requested to perform the setting up or release of a first SCell 150A may be based on one or more of an indication received from first network node 115A or from a second network node 115B, an indication from wireless device 110A, and a request sent to the wireless device 110A by third network node 115C.

In a particular embodiment, a second time or delay (Tactivate_total or T2), over which wireless device 110A performs or is expected to perform the setting up or release of the first SCell 150A while wireless device 110A is requested to also perform setting up or release of the at least second SCell 150B, wherein T2>T1 may be determined. Optionally, the sending of the second SCell setup or release message to wireless device 110A may be delayed where T2 is larger than T1 by a certain margin. Optionally, the determination of the T1 and T2 may be based on a pre-defined rule or information. Optionally, the SCell setup or release message may contain a request for the UE to perform any one or more of the following tasks: configuration of the SCell or SCell addition, de-configuration of the SCell or SCell release, activation of the SCell, and deactivation of the SCell. Optionally, T1 and T2 may correspond to the SCell activation delay or SCell deactivation delay.

In a particular embodiment, the first, second and third network nodes 115A-C may be the same or may be co-located at the same site. In a particular embodiment, the PCell 140A, first SCell 150B, second SCell 150C, and third SCell may operate on a first carrier frequency (f1), a second carrier frequency (f2), a third carrier frequency (f3) and a fourth carrier frequency (f4), respectively.

Other implementations may include a wireless communication device and/or access node configured to implement the described method, or a wireless communication system in which a wireless communication device and/or access node implement the described method.

Some embodiments of the disclosure may provide one or more technical advantages. For example, in certain embodiments, techniques employed may enable the wireless device (i.e., user equipment) to correctly activate or deactivate a SCell while it is requested to activate, deactivate, configure or deconfigure one or more additional SCells. Another technical advantage may be that the techniques may enable the network node to be aware of user equipment performance (e.g. time to perform SCell setup or release) when the user equipment performs setting up or release of more than one SCell during at least partly overlapping time. Still another technical advantage may be that the techniques ensure that the user equipment behavior is well defined and consistent even if the user equipment is requested to setup or release several SCells during at least partly overlapping time. Still another technical advantage may be that the network node does not have to wait for the completion of SCell setup or release for one SCell for setting up or release of another SCell. That is, the network node can independently request the user equipment to perform SCell setup or release for more than one SCells.

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A method for activating multiple secondary cells by a wireless device using carrier aggregation to receive signals from a plurality of carriers in a primary cell (PCell) and a plurality of secondary cells (SCells) (, the method comprising:

receiving a first message requesting activation of a first secondary cell (first SCell) for a first carrier;

in response to the first message, initiating a first procedure to activate the first SCell, the wireless device having a first delay period ($T_{activate\_basic}$) within which to complete the first procedure;

while performing the first procedure to activate the first SCell, receiving a second message to activate or configure a second SCell for a second carrier;

in response to receiving the second message to activate or configure the second SCell, modifying the first procedure by replacing the first delay period with a second delay period ($T_{activate\_total}$) within which to complete the first procedure to activate the first SCell, the second delay period ($T_{activate\_total}$) being greater than the first delay period ($T_{activate\_basic}$).

2. The method of claim 1, wherein the second delay period ($T_{activate\_total}$) is at least a function of an integer K that is a number of times the wireless device is requested to perform activation or configuration of the second SCell while the first procedure is being performed to activate the first SCell.

3. The method of claim 1, wherein:
$T_{activate\_basic}$=24 subframes where:
the first SCell remains detectable during the first procedure; and
during at least a third delay period before the reception of the first message, the wireless device has transmitted a measurement report for the first SCell and the first SCell remains detectable;
otherwise $T_{activate\_basic}$=34 subframes where the wireless device successfully detects the first SCell on a first attempt to detect the first SCell during the first procedure.

4. The method of claim 1, wherein the second delay period ($T_{activate\_total}$) is expressed as:

$$(T_{activate\_total})=T_{activate\_basic}+K*5$$

where K is an integer number representing a number of times the wireless device is requested to perform activation or configuration of the second SCell while the first procedure is being performed to activate the first SCell.

5. The method of claim 1, further comprising:
while performing the first procedure, receiving a third message requesting activation or configuration of a third secondary cell (third SCell).

6. The method of claim 5, wherein:
the first message is received from a first network node;
the second message is received from a second network node; and
the third message is received from a third network node.

7. The method of claim 6, wherein the first, second, and third network nodes are co-located at the same site or are in a same network node.

8. A wireless device using carrier aggregation to receive signals from a plurality of carriers in a primary cell (Pcell) and a plurality of secondary cells (SCells), the wireless device comprising:
memory containing executable instructions; and
one or more processors in communication with the memory, the one or more processors operable to execute the instructions to cause the wireless device to:
receive a first message requesting activation of a first secondary cell (first SCell) for a first carrier;
in response to the first message, initiate a first procedure to activate the first SCell, the wireless device having a first delay period ($T_{activate\_basic}$) within which to complete the first procedure;
while performing the first procedure to activate the first SCell, receive a second message to activate or configure a second SCell for a second carrier;
in response to receiving the second message to activate or configure the second SCell, modify the first procedure by replacing the first delay period with a second delay period ($T_{activate\_total}$) within which to complete the first procedure to activate the first SCell, the second delay period ($T_{activate\_total}$) being greater than the first delay period ($T_{activate\_basic}$).

9. The wireless device of claim 8, wherein the second delay period ($T_{activate\_total}$) is at least a function of an integer K that is a number of times the wireless device is requested to perform activation or configuration of the second SCell while the first procedure is being performed to activate the second SCell.

10. The wireless device of claim 8, wherein:
$T_{activate\_basic}$=24 subframes where:
the first SCell remains detectable during the first procedure; and
during at least a third delay period before the reception of the first message, the wireless device has transmitted a measurement report for the first SCell and the first SCell remains detectable;
otherwise $T_{activate\_basic}$=34 subframes where the wireless device successfully detects the first SCell on a first attempt to detect the first SCell during the first procedure.

11. The wireless device of claim 8, wherein the second delay period ($T_{activate\_total}$) is expressed as:

$$(T_{activate\_total})=T_{activate\_basic}+K*5$$

where K is an integer number representing a number of times the wireless device is requested to perform activation or configuration of the second SCell while the first procedure is being performed to activate the first SCell (150A).

12. The wireless device of claim 8, wherein the one or more processors are further operable to execute the instructions to cause the wireless device to:
while performing the first procedure, receive a third message requesting activation or configuration of a third secondary cell (third SCell).

13. The wireless device of claim 12, wherein:
the first message is received a first network node;
the second message is received from a second network node; and
the third message is received from a third network node.

14. The wireless device of claim 13, wherein the first, second, and third network nodes are co-located at the same site or are in a same network node.

15. A method in a first network node serving a wireless device that is using carrier aggregation to receive signals from a plurality of carriers in a primary cell (Pcell) and a plurality of secondary cells (SCells), the method comprising:
determining, by the first network node, that the wireless device has received a first message requesting the wireless device to activate a first SCell for a first carrier;
determining, by the first network node, a delay period ($T_{activate\_basic}$) within which the wireless device is to activate the first SCell; and
delaying, by the first network node, sending a second message requesting the activation or configuration of a second SCell, the second message delayed an amount of time that is a function of the delay period.

16. The method of claim 15, wherein determining that the wireless device has received the first message comprises one or more of: retrieving an indication from a first network node associated with the PCell;
receiving an indication from a second network node associated with the first SCell;
receiving an indication from the wireless device; and
sending, by the network node, a request to the wireless device.

17. The method of claim 15, further comprising:
determining, by the first network node, that the wireless device has received a third message requesting the wireless device to activate or configure a third SCell;
determining, by the first network node, a total delay period ($T_{activate\_total}$) within which the wireless device is to complete the activation of the first SCell, wherein the total delay period ($T_{activate\_total}$) for activating the first SCell is greater than the delay period ($T_{activate\_basic}$) if the wireless device receives the third message to activate or configure the third SCell while activating or deactivating the first SCell.

18. The method of claim 17, further comprising:
delaying, by the first network node, sending of the second message requesting the activation or configuration of the second SCell, where total delay period ($T_{activate\_total}$) is greater than the delay period ($T_{activate\_basic}$) by a predefined amount.

19. The method of claim 17, wherein the determination of the total delay period ($T_{activate\_total}$) and the delay period ($T_{activate\_basic}$) is based on a predefined rule.

20. The method of claim 17, wherein:
the first message is received by the wireless device from the first network node;
the second message is to be sent from a second network node; and
the third message is received from a third network node.

21. The method of claim 20, wherein the first network node, the second network node, and the third network node are co-located at the same site or are in a same network node.

22. A first network node serving a wireless device that uses carrier aggregation to receive signals from a plurality of carriers in a primary cell (Pcell) and a plurality of secondary cells (SCells), the network node (115A) comprising:
memory containing executable instructions; and
one or more processors in communication with the memory, the one or more processors operable to execute the instructions to cause the first network node to:
determine that the wireless device has received a first message requesting the wireless device to activate a first SCell for a first carrier;
determine a delay period ($T_{activate\_basic}$) within which the wireless device is to activate the first SCell; and
delay sending of a second message requesting the activation or configuration of a second SCell, the second message delayed an amount of time that is a function of the delay period.

23. The first network node of claim 22, wherein determining that the wireless device has received the first message comprises one or more of:
retrieving an indication from a first network node associated with the PCell;
receiving an indication from a second network node associated with the first SCell;
receiving an indication from the wireless device; and
sending, by the network node, a request to the wireless device.

24. The first network node of claim 22 wherein the one or more processors are further operable to execute the instructions to cause the first network node to:
determine that the wireless device has received a third message requesting the wireless device to activate or configure a third SCell;
determine a total delay period ($T_{activate\_total}$) within which the wireless device is to complete the activation of the first SCell, wherein the total delay period ($T_{activate\_total}$) for activating the first SCell is greater than the delay period ($T_{activate\_basic}$) if the wireless device receives the third message to activate or configure the third SCell while for activating the first SCell.

25. The first network node of claim 24, wherein the one or more processors are further operable to execute the instructions to cause the first network node to:
delay, by the first network node, sending of the second message requesting the activation or configuration of the second SCell, where total delay period ($T_{activate\_total}$) is greater than the delay period ($T_{activate\_basic}$) by a predefined amount.

26. The first network node of claim 24, wherein the determination of the total delay period ($T_{activate\_total}$) and the delay period ($T_{activate\_basic}$) is based on a predefined rule.

27. The first network node of claim 24, wherein:
the first message is received from the first network node;
the second message is to be sent from a second network node; and
the third message is received from a third network node.

28. The first network node of claim 27, wherein the first network node, the second network node, and the third network node are co-located at the same site or are in a same network node.

* * * * *